(12) United States Patent
Oteri et al.

(10) Patent No.: US 10,979,116 B2
(45) Date of Patent: Apr. 13, 2021

(54) MULTIPLE CHANNEL TRANSMISSION IN MMW WLAN SYSTEMS

(71) Applicant: INTERDIGITAL PATENT HOLDINGS, INC., Wilmington, DE (US)

(72) Inventors: Oghenekome Oteri, San Diego, CA (US); Hanqing Lou, Syosset, NY (US); Rui Yang, Greenlawn, NY (US); Li-Hsiang Sun, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/331,018

(22) PCT Filed: Sep. 8, 2017

(86) PCT No.: PCT/US2017/050609
§ 371 (c)(1),
(2) Date: Mar. 6, 2019

(87) PCT Pub. No.: WO2018/049113
PCT Pub. Date: Mar. 15, 2018

(65) Prior Publication Data
US 2019/0260446 A1   Aug. 22, 2019

Related U.S. Application Data

(60) Provisional application No. 62/385,081, filed on Sep. 8, 2016, provisional application No. 62/442,771, filed on Jan. 5, 2017.

(51) Int. Cl.
*H04B 7/06* (2006.01)
*H04W 72/04* (2009.01)
(Continued)

(52) U.S. Cl.
CPC ......... *H04B 7/0617* (2013.01); *H04B 7/0695* (2013.01); *H04L 5/0053* (2013.01);
(Continued)

(58) Field of Classification Search
CPC ...... H04B 7/0617; H04B 7/0695; H04B 7/02; H04L 5/0053; H04W 72/042; H04W 74/006; H04W 84/12
(Continued)

(56) References Cited

U.S. PATENT DOCUMENTS

2007/0153830 A1   7/2007  Xhafa et al.
2011/0286378 A1*  11/2011 Kim .................. H04L 45/74
                                                    370/312
(Continued)

FOREIGN PATENT DOCUMENTS

EP    2958391 B1    6/2018
WO    2017/156315   9/2017
WO    2017/197189   11/2017

OTHER PUBLICATIONS

Agilent Technologies, "Wireless LAN and 60 GHz—IEEE 802.11ad Explained," pp. 1-28 (May 20, 2013).
(Continued)

*Primary Examiner* — Obaidul Huq
(74) *Attorney, Agent, or Firm* — Volpe Koenig

(57) ABSTRACT

Multiple channel transmission in mmW Wireless Local Area Network (WLAN) systems may be provided. Multi-channel aggregation and channel bonding may include, for example, multi-channel aggregation for a single transmitter/receiver pair or multi-channel aggregation and bonding for multiple transmitter/receiver pairs with frequency and space based multiple access. Multi-channel beamforming may include, for example, one analog beam across two channels and analog circuits on each channel or a single analog circuit on
(Continued)

| L-STF | L-CEF | L-Header | EDMG-Header-A | EDMG-STF | EDMG-CEF | EDMG-Header-B | Data | AGC | TRN | both channels, one analog beam across two channels and separate digital precoding schemes on each channel, one analog beam across a primary channel and separate digital precoding schemes on each channel or two analog beams on two channels and separate digital precoding on each channel. Preamble signaling may be provided.

12 Claims, 22 Drawing Sheets

(51) Int. Cl.
    *H04L 5/00*     (2006.01)
    *H04W 74/00*     (2009.01)
    *H04W 84/12*     (2009.01)
    *H04B 7/02*     (2018.01)

(52) U.S. Cl.
    CPC ....... *H04W 72/042* (2013.01); *H04W 74/006* (2013.01); *H04B 7/02* (2013.01); *H04W 84/12* (2013.01)

(58) Field of Classification Search
    USPC .......................................... 370/310, 328, 338
    See application file for complete search history.

(56) References Cited

U.S. PATENT DOCUMENTS

| | | | | |
|---|---|---|---|---|
| 2016/0249332 | A1* | 8/2016 | Xin | H04L 27/206 |
| 2016/0330738 | A1* | 11/2016 | Eitan | H04L 1/0079 |
| 2017/0202011 | A1* | 7/2017 | Trainin | H04W 74/0816 |
| 2019/0124652 | A1* | 4/2019 | Kim | H04L 5/0092 |

OTHER PUBLICATIONS

Cariou et al., "Bandwidth signaling for EDMG," 802.11-16/0954r0 (Jul. 25, 2016).
Cariou et al., "Preliminary design of EDMG PHY headers," 802.11-16/1046r0 (Jul. 28, 2016).
Chen et al., "MAC and PHY Proposal for 802.11af," IEEE 802.11-10/0258r0 (Mar. 2010).
CMCC, "New Study Item Proposal: Study on Scenarios and Requirements for Next Generation Access Technologies," 3GPP TSG RAN Meeting #70, RP-152257, Sitges, Spain (Dec. 7-10, 2015).
Cordeiro, "Specification Framework for TGay," IEEE P802.11 Wireless LANs, IEEE 802.11-15/1358r4 (Jun. 13, 2016).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Godara, "Application of antenna arrays to mobile communications. II. Beam-forming and direction-of-arrival considerations," Proceedings of the IEEE, vol. 85, Issue 8, pp. 1195-1245 (Aug. 1997).
Halasz, "Sub 1 GHz license-exempt PAR and 5C," IEEE P802.11 Wireless LANs, IEEE 802.11-10/0001r13 (Jul. 2010).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE P802.11ah/D9.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah/D9.0 (Aug. 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
Interdigital, "Beam-based design framework for New Radio," 3GPP TSG-RAN WG1 #86, R1-167332 (R1-164874), Gothenburg, Sweden (Aug. 22-26, 2016).
Kasher et al., "EDMG Header Encoding and Modulation," IEEE 802.11-16/1011r1 (Jul. 26, 2016).
Lomayev et al., "EDMG Header-B Encoding and Modulation for SC PHY in 11ay," IEEE 802.11-16/0989r0 (Jul. 25, 2016).
Lomayev et al., "EDMG STF and CEF Design for SC PHY in 11ay," IEEE 8802.11-16/0994r1 (Jul. 27, 2016).
Lomayev et al., "Non-EDMG Part of Preamble for MIMO in 11ay," IEEE 802.11-16/XXXXro (802.11-16/0988r0) (Jul. 25, 2016).
Maltsev et al., "Channel Models for IEEE 802.11ay," P802.11 Wireless LANs, IEEE 802.11-15/1150r4 (Sep. 12, 2015).
NTT Docomo, "New SID Proposal: Study on New Radio Access Technology," 3GPP TSG RAN Meeting #71, RP-160671, Göteborg, Sweden (Mar. 7-10, 2016).
Sun et al., "IEEE 802.11 TGay Use Cases," IEEE 802.11-2015/0625r2 (May 2015).
Third Generation Partnership Project, "Technical Specification Group Radio Access Network; Requirements for further advancements for Evolved Universal Terrestrial Radio Access (E-UTRA) (LTE-Advanced) (Release 14)," 3GPP TR 36.913 V14.0.0 (Mar. 2017).
Third Generation Partnership Project, "Technical Specification Group Radio Access Network; Requirements for further advancements for Evolved Universal Terrestrial Radio Access (E-UTRA) (LTE-Advanced) (Release 13)," 3GPP TR 36.913 V13.0.0 (Dec. 2015).
Third Generation Partnership Project, "Technical Specification Group Radio Access Network; Study on Scenarios and Requirements for Next Generation Access Technologies; (Release 14)," 3GPP TR 38.913 V0.4.0 (Jun. 2016).
Third Generation Partnership Project, "Technical Specification Group Radio Access Network; Study on Scenarios and Requirements for Next Generation Access Technologies; (Release 14)," 3GPP TR 38.913 V14.3.0 (Jun. 2017).

(56) References Cited

OTHER PUBLICATIONS

Third Generation Partnership Project, "Technical Specification Group Radio Access Network; Study on Scenarios and Requirements for Next Generation Access Technologies; (Release 14)," 3GPP TR 38.913 V0.3.0 (Mar. 2016).

Eitan et al, "EDMG Header-A Fields preview in L-Header," IEEE 802.11-16/1395-01-00 (Nov. 7, 2016).

Motozuka et al., "L-Header spoofing and bit reuse," IEEE 802.11-16/1422r0 (Nov. 8, 2016).

\* cited by examiner

FIG. 3

| Frame Control | Duration | RA | TA | SSW | SSW Feedback | FCS |
|---|---|---|---|---|---|---|
| 2 | 2 | 6 | 6 | 3 | 3 | 4 |

Octets:

FIG. 4

| Direction | CDOWN | Sector ID | DMG Antenna ID | RXSS Length |
|---|---|---|---|---|
| B0 | B1 — B9 | B10 — B15 | B16 — B17 | B18 — B23 |
| 1 | 9 | 6 | 2 | 6 |

Bits

FIG. 5

| Total Sectors in ISS | Number of RX DMG Antennas | Reserved | Poll Required | Reserved |
|---|---|---|---|---|
| B0 — B8 | B9 — B10 | B11 — B15 | B16 | B17 — B23 |
| 9 | 2 | 5 | 1 | 7 |

Bits:

| Sector Select | DMG Antenna Select | SNR Report | Poll Required | Reserved |
|---|---|---|---|---|
| B0 — B5 | B6 — B7 | B8 — B15 | B16 | B17 — B23 |
| 6 | 2 | 8 | 1 | 7 |

Bits:

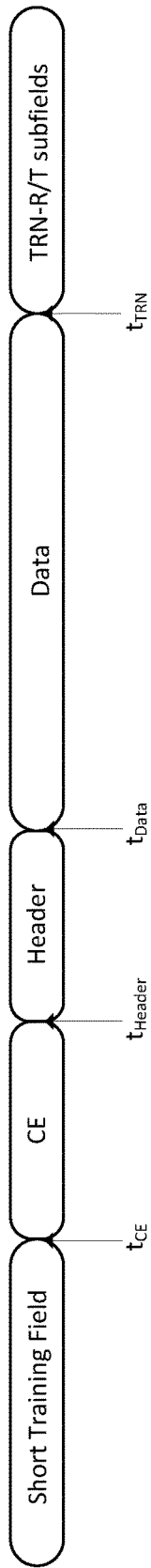
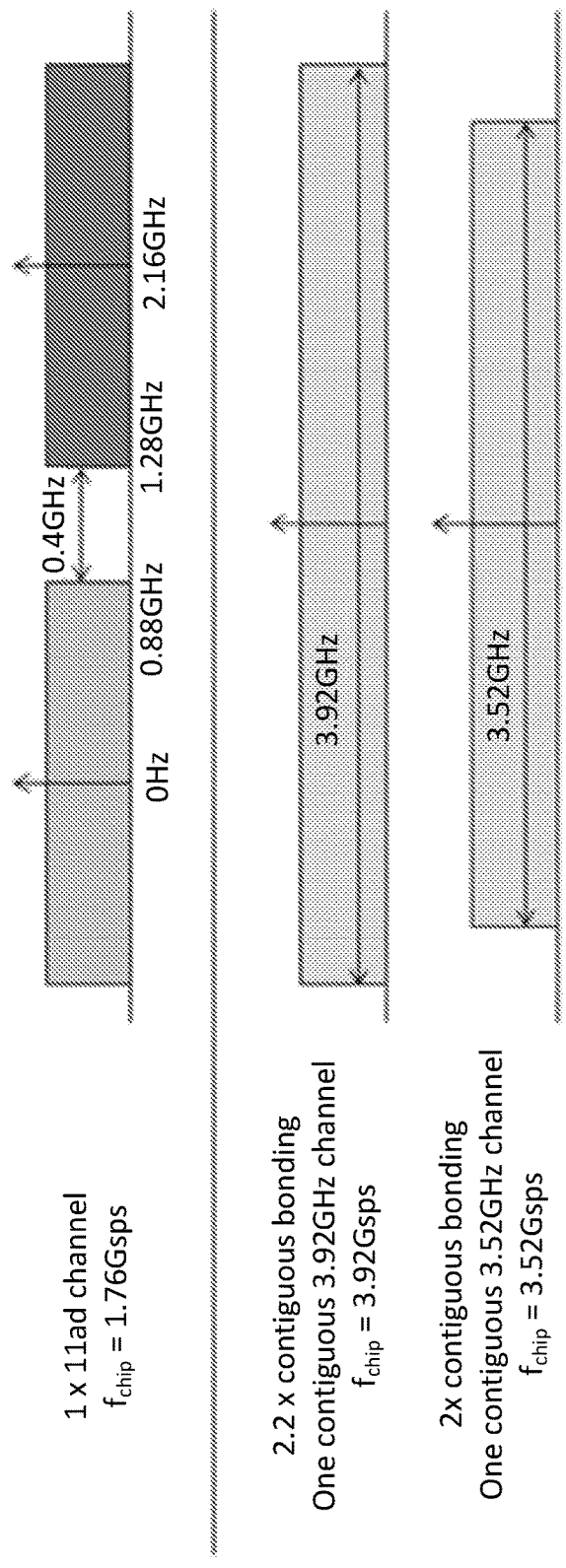
FIG. 7
FIG. 8
* Only payload spectrum shown

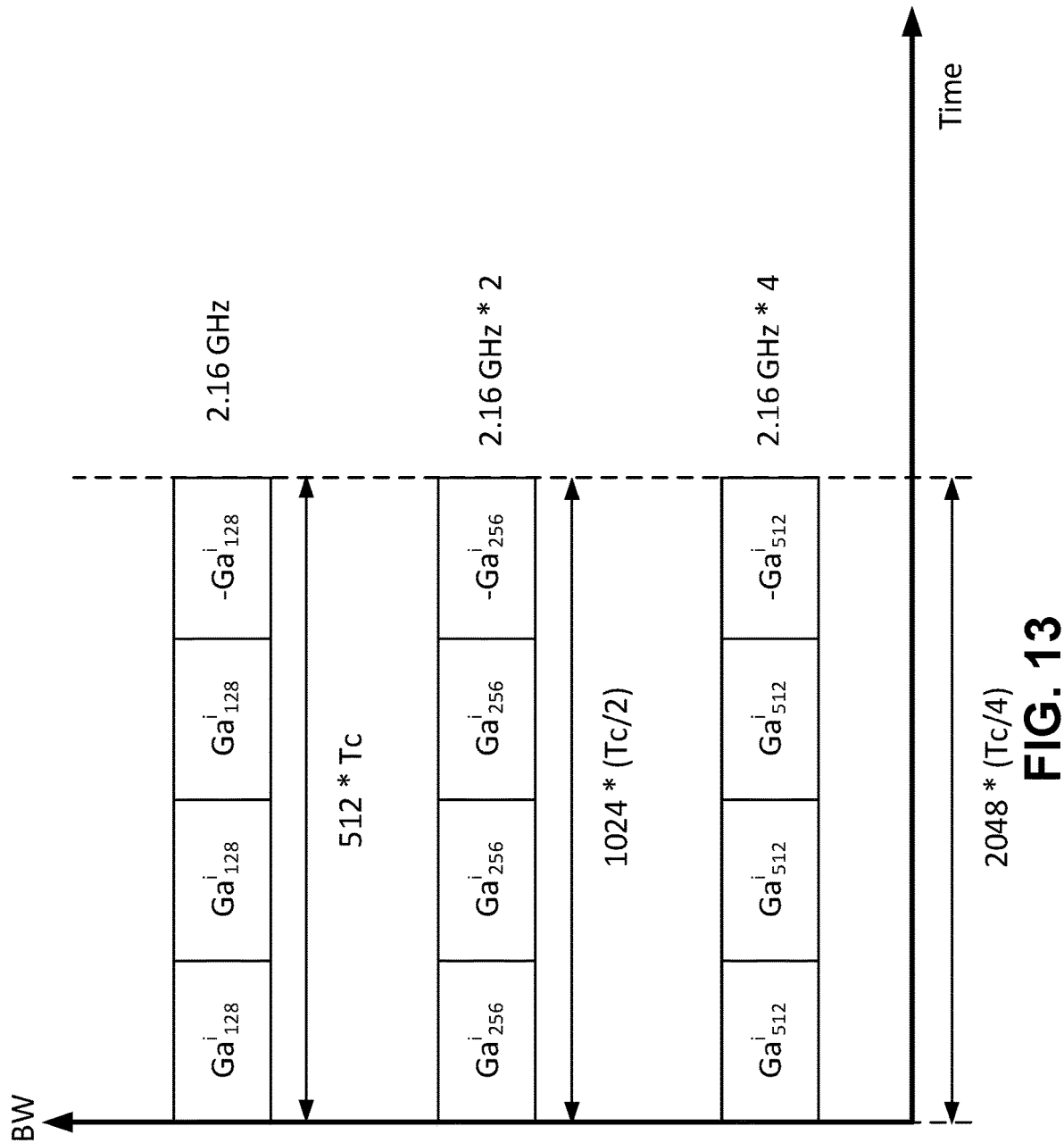

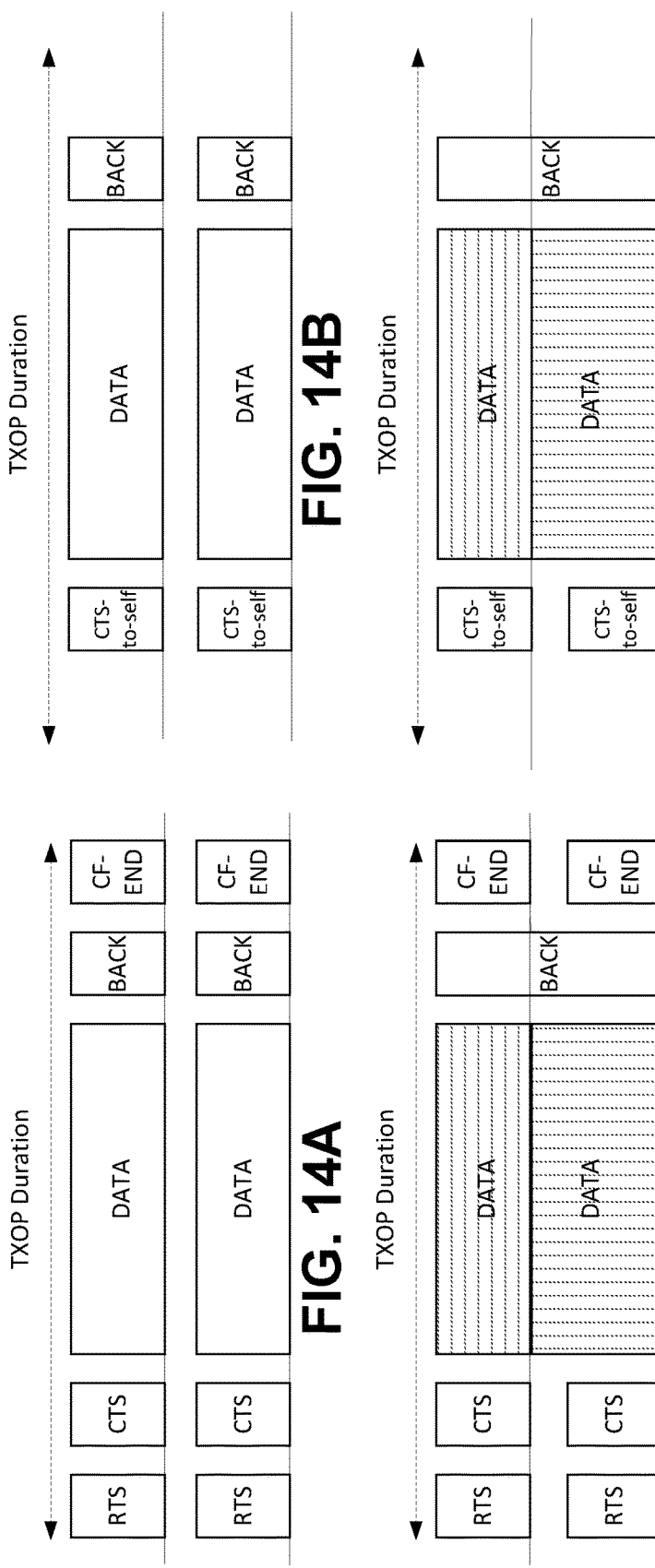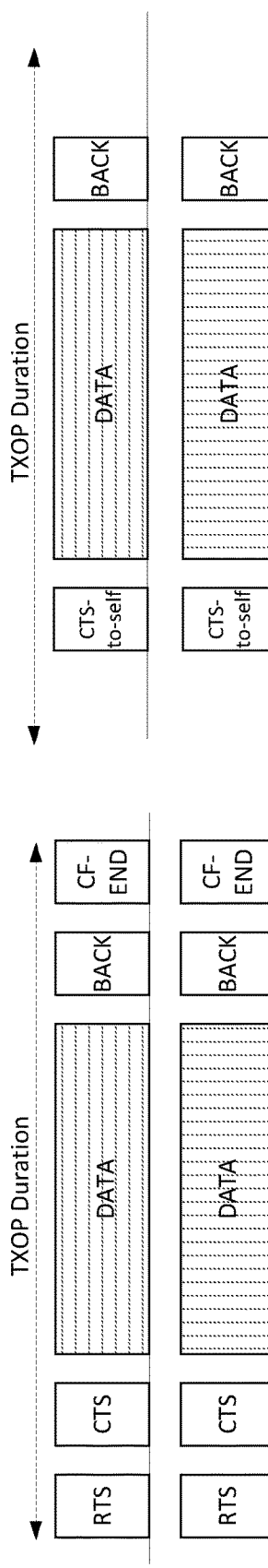

Channel Aggregation: Single carrier with multiple spatial beams

Channel Bonding, OFDMA with multiple spatial beams

Channel Aggregation, OFDMA with multiple spatial beams

MULTIPLE CHANNEL TRANSMISSION IN MMW WLAN SYSTEMS

CROSS-REFERENCE TO RELATED APPLICATIONS

This application is the U.S. National Stage, under 35 U.S.C. § 371, of International Application No. PCT/US2017/050609 filed Sep. 8, 2017, which claims the benefit of U.S. Provisional Application Ser. No. 62/385,081 filed Sep. 8, 2016, and U.S. Provisional Application Ser. No. 62/442,771 filed Jan. 5, 2017, the contents of which are incorporated by reference herein, and this application claims benefit of the filing date of these priority applications.

BACKGROUND

A Wireless Local Area Network (WLAN) may have multiple modes of operation, such as an Infrastructure Basic Service Set (BSS) mode and an Independent BSS (IBSS) mode. A WLAN in Infrastructure BSS mode may have an Access Point (AP) for the BSS. One or more wireless transmit receive units (WTRUs), e.g., stations (STAs), may be associated with an AP. An AP may have access or an interface to a Distribution System (DS) or other type of wired/wireless network that carries traffic in and out of a BSS. Traffic to STAs that originates from outside a BSS may arrive through an AP, which may deliver the traffic to the STAs. STA to STA communication may occur in a WLAN system. An AP may act in the role of a STA in a WLAN system. Beamforming may be used by WLAN devices.

SUMMARY

Systems, methods, and instrumentalities are disclosed for multiple channel transmission in mmW WLAN systems. Multi-channel aggregation and channel bonding may comprise, for example, multi-channel aggregation for a single transmitter/receiver pair or multi-channel aggregation and bonding for multiple transmitter/receiver pairs with frequency and space based multiple access. Multi-channel beamforming may comprise, for example, one analog beam across two channels and analog circuits on each channel or a single analog circuit on both channels, one analog beam across two channels and separate digital precoding schemes on each channel, one analog beam across a primary channel and separate digital precoding schemes on each channel or two analog beams on two channels and separate digital precoding on each channel. Preamble signaling may be provided.

A device (e.g., a STA or an AP) may determine to transmit an enhanced directional multi-gigabit (EDMG) packet frame in place of a directional multi-gigabit (DMG) packet. The DMG packet may include a DMG BRP-receiver (BRP-RX) packet. The EDMG frame may include a legacy-header (L-header). The L-header may include a length field. The device may determine a value of the length field. When the value of the length field is used to calculate a transmitter time (TXTIME), the TXTIME may be approximately the same duration as a EDMG packet frame duration. The device may send the EDMG packet frame with the length field of the L-header set to the determined value. Reserved bit 46 in the L-header may be set to a value of 1. The device may be configured to determine a duration associated with the EDMG packet frame. The EDMG packet frame may include one or more of the following: an L-header packet type field, an L-header beam tracking requested field, and/or a packet type field. The EDMG packet frame may be a DMG single carrier (SC) physical (PHY) frame.

BRIEF DESCRIPTION OF THE DRAWINGS

FIG. 3 is an example format for a sector sweep (SSW) frame.

FIG. 4 is an example format for a SSW field in a SSW frame.

FIG. 5 is an example of a SSW feedback field in a SSW frame.

FIG. 7 is an example of a directional multi gigabit (DMG) PPDU format.

FIG. 8 is an example of channel bonding versus aggregation framework.

FIG. 10 is an example of channelization.

FIG. 13 is an example of EDMG-short training field (STF).

FIG. 14 is an example of channel aggregation and bonding in 802.11ay.

FIG. 15 is an example of channel bonding with frequency-based multiple access using OFDMA.

FIG. 16 is an example of channel aggregation with frequency-based multiple access using SC and OFDMA.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
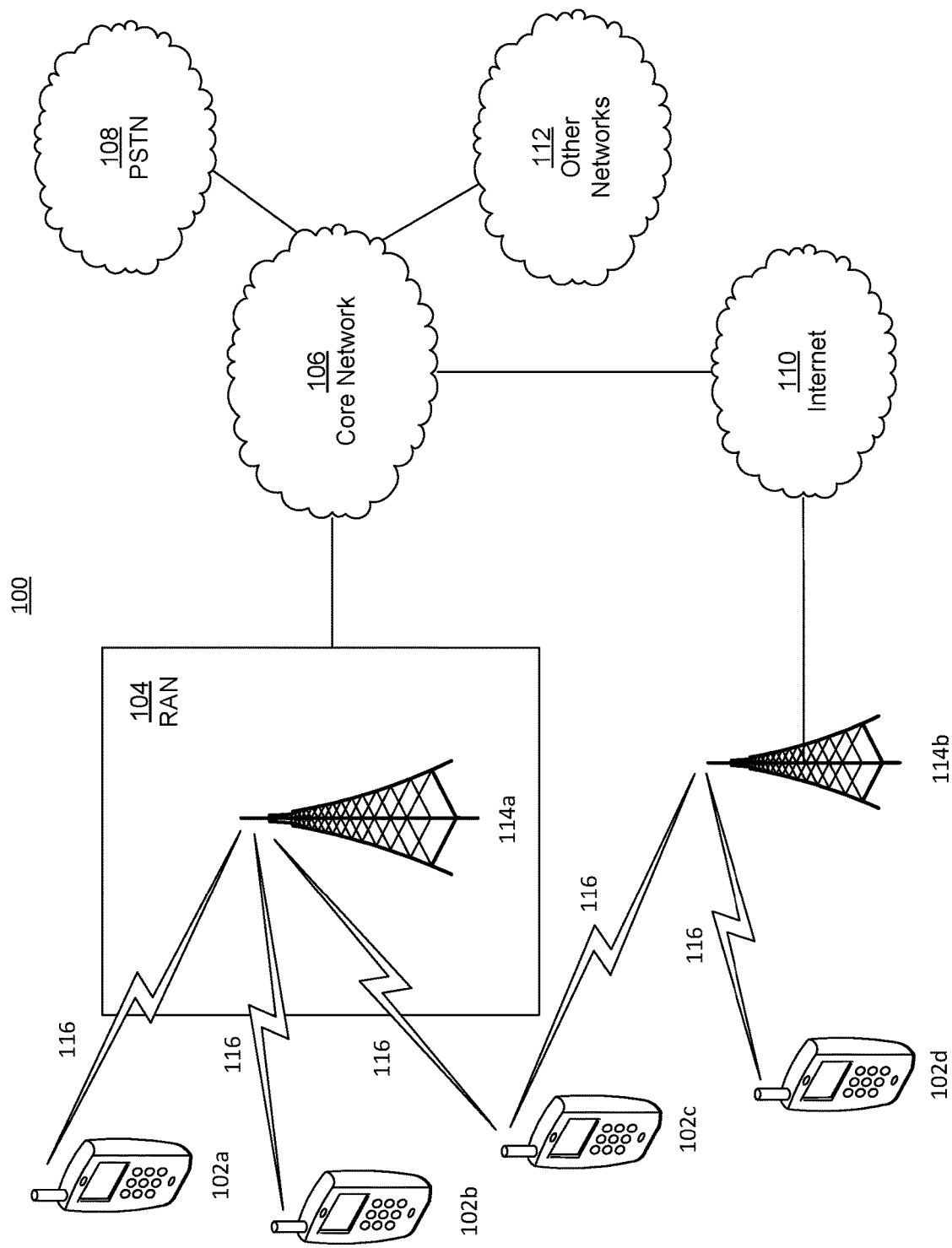
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers.

For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
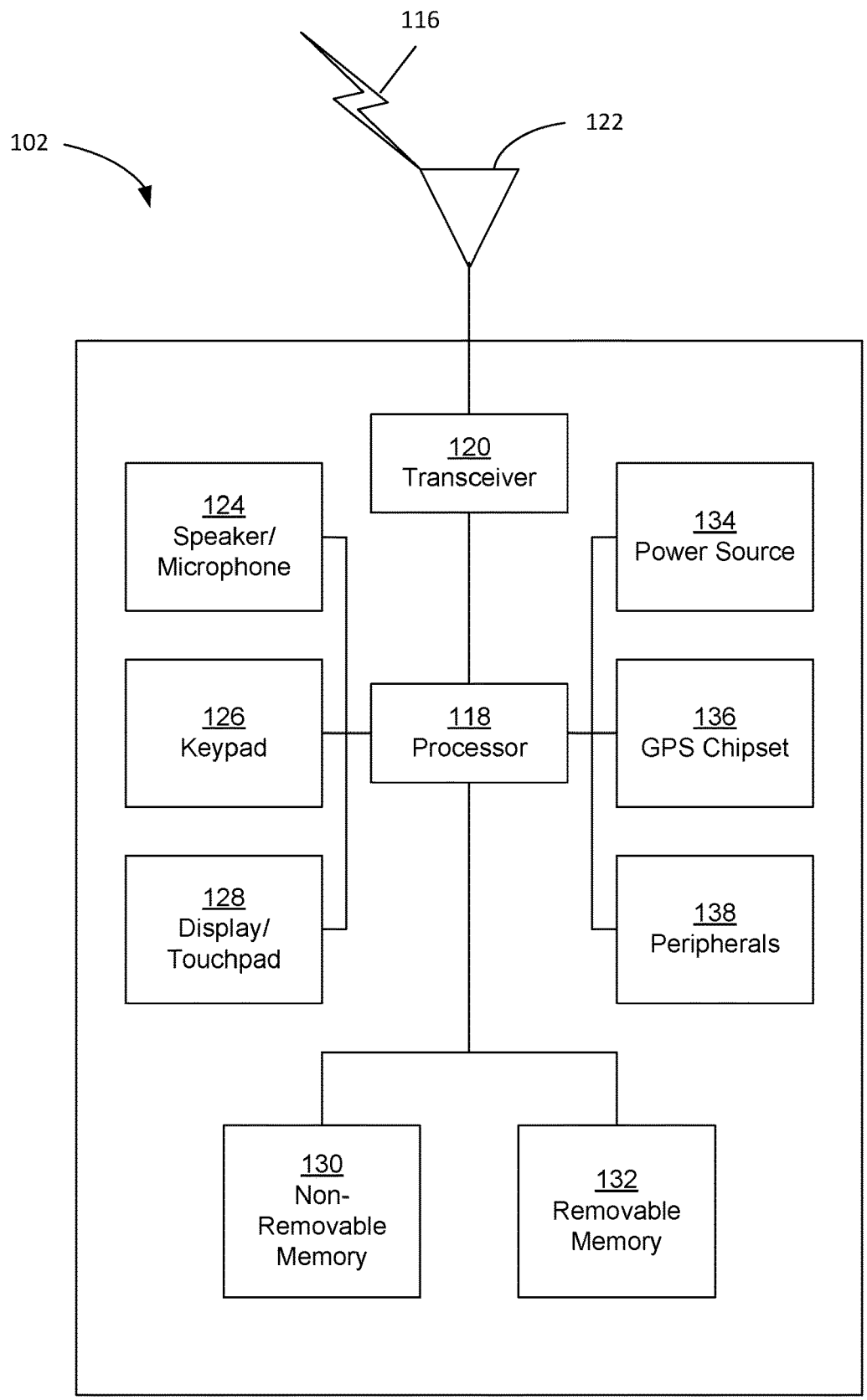
FIG. 1B is a system diagram illustrating an example wireless transmit/receive unit (WTRU) that may be used within the communications system illustrated in FIG. 1A according to an embodiment.
Figure 1C:
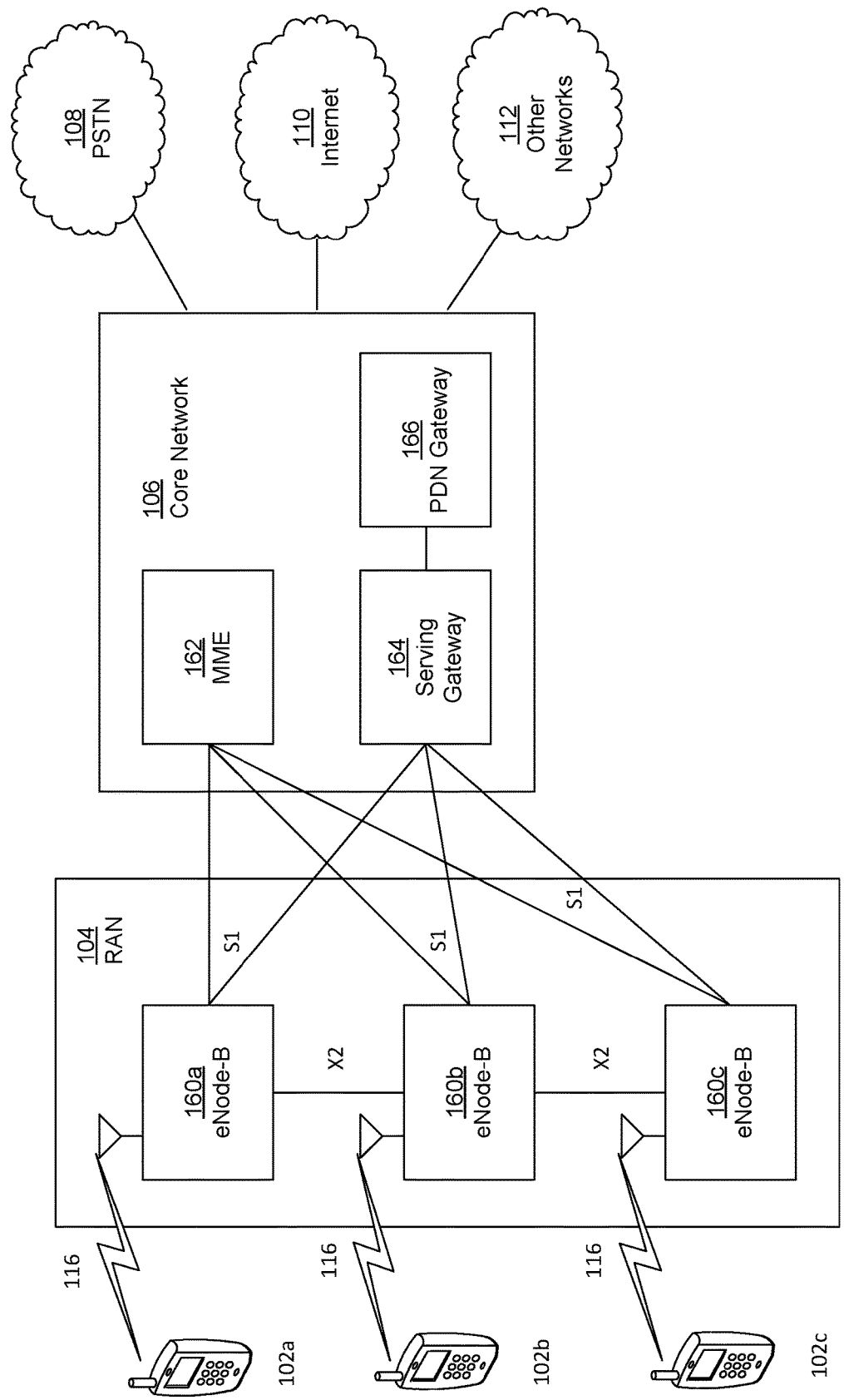
FIG. 1D is a system diagram illustrating a further example RAN and a further example CN that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (10), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
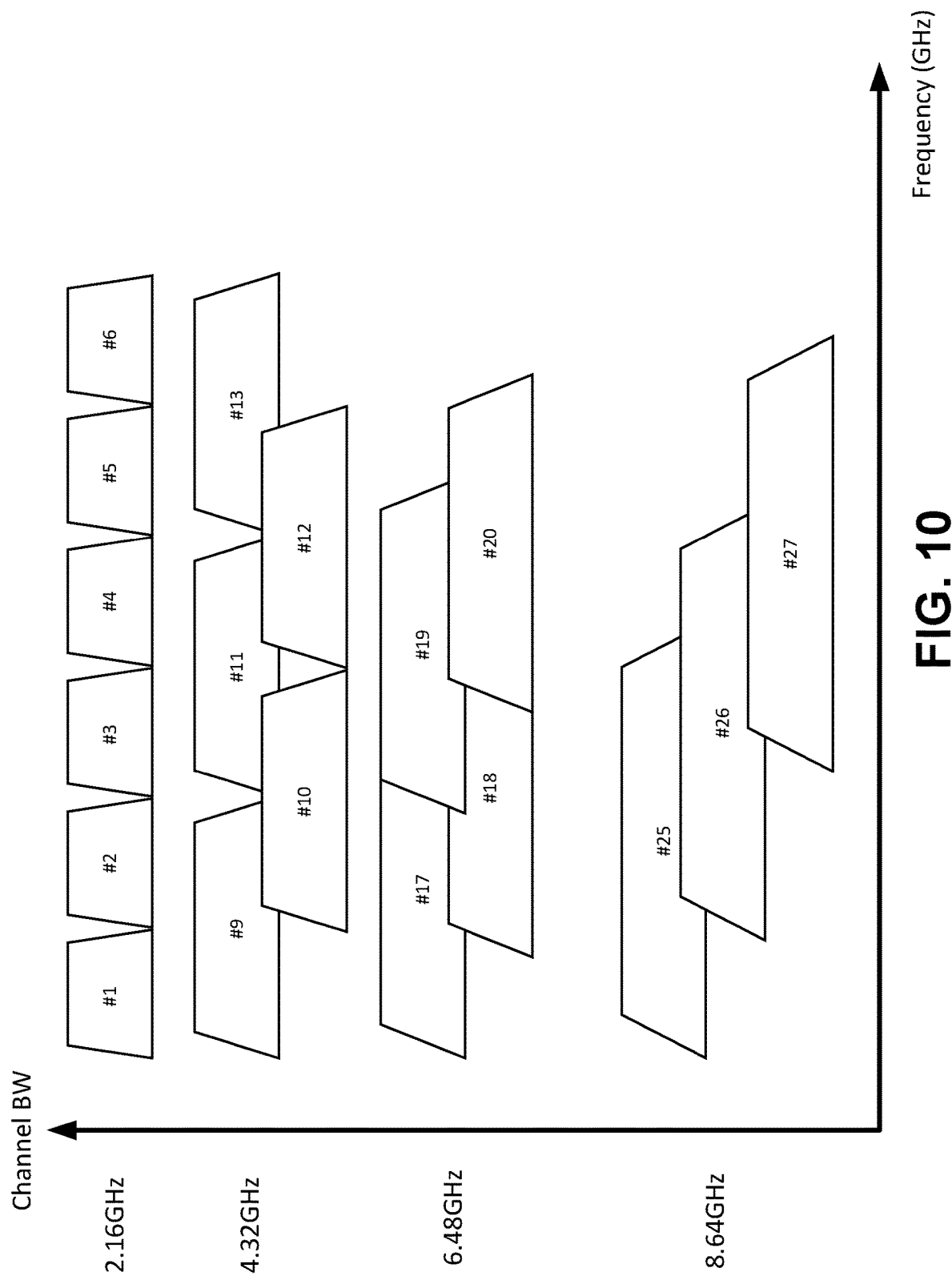
FIG. 10 is a system diagram illustrating an example radio access network (RAN) and an example core network (CN) that may be used within the communications system illustrated in FIG. 1A according to an embodiment.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
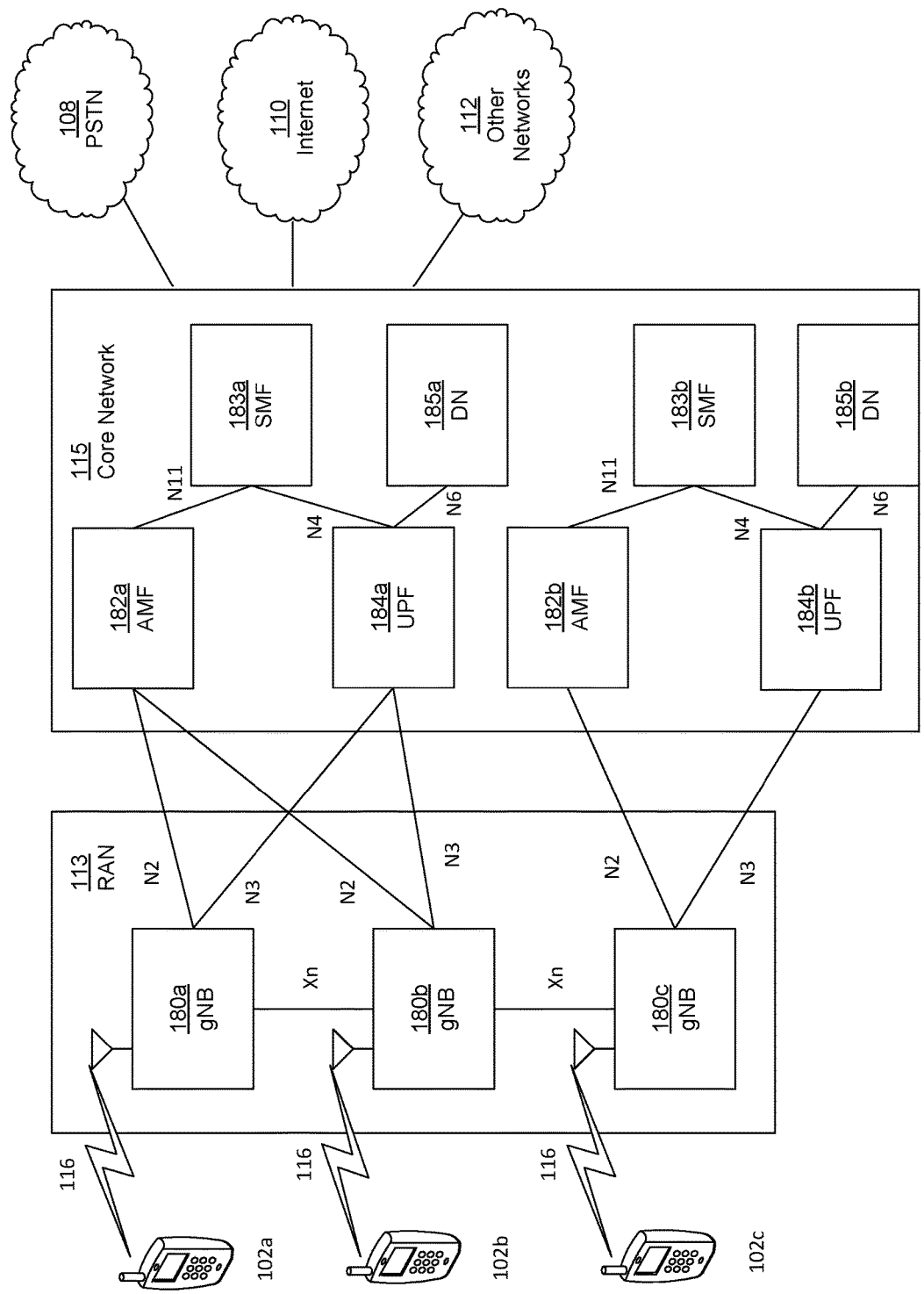

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a*-*d*, Base Station 114*a*-*b*, eNode-B 160*a*-*c*, MME 162, SGW 164, PGW 166, gNB 180*a*-*c*, AMF 182*a*-*b*, UPF 184*a*-*b*, SMF 183*a*-*b*, DN 185*a*-*b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WLAN may have an infrastructure basic service set (BSS) mode that may have an access point (AP/personal BSS coordination point (PCP)) for the BSS and one or more stations (STAs) associated with the AP/PCP. An AP/PCP may have an access or interface to a distribution system (DS) or another type of wired and/or wireless network that may carry traffic in and out of the BSS. Traffic to STAs that may originate from outside a BSS may arrive through an AP/PCP and may be delivered to the STAs. Traffic that may originate from STAs to destinations outside the BSS may be sent to the AP/PCP and may be delivered to the respective destinations. Traffic between STAs within the BSS may (e.g., also) be sent through the AP/PCP where the source STA may send traffic to the AP/PCP, and the AP/PCP may deliver the traffic to the destination STA. Traffic between STAs within a BSS may be peer-to-peer traffic. Peer-to-peer traffic may be sent between source and destination STAs with a direct link setup (DLS), which may use an 802.11e DLS or an 802.11z tunneled DLS (TDLS) and may be sent directly. A WLAN may use an independent BSS (IBSS) mode. A WLAN may have no AP/PCP and/or STAs. A WLAN may communicate (e.g., directly) with another WLAN. This mode of communication may be referred to as an ad-hoc mode of communication.

An AP/PCP may use an 802.11ac infrastructure mode of operation. An AP/PCP may transmit a beacon and may do so on a fixed channel. A fixed channel may be the primary channel. A channel may be 20 MHz wide and may be the operating channel of the BSS. A channel may be used by STAs and may be used to establish a connection with the AP/PCP. A (e.g., fundamental) channel access mechanism in a 802.11 system may be carrier sense multiple access with collision avoidance (CSMA/CA). A STA (e.g., where a STA may include an AP/PCP) may sense the primary channel, for example, in CSMA/CA. A channel may be detected to be busy. A STA may back off, for example, when a channel is detected to be busy. A STA may transmit at any given time in a given BSS (e.g., using CSMA/CA).

In 802.11n, high throughput (HT) STAs may use a 40 MHz wide channel for communication. This may be achieved, for example, by combining a primary 20 MHz channel with an adjacent 20 MHz channel to form a 40 MHz wide contiguous channel.

In 802.11ac, very high throughput (VHT) STAs may support 20 MHz, 40 MHz, 80 MHz, and/or 160 MHz wide channels. 40 MHz and 80 MHz channels may be formed, for example, by combining contiguous 20 MHz channels, e.g., similar to 802.11n. A 160 MHz channel may be formed, for example, by combining eight contiguous 20 MHz channels or by combining two non-contiguous 80 MHz channels, which may be referred to as an 80+80 configuration. Data may be channel encoded and may be passed through a segment parser (e.g., after channel encoding). A segment parser may divide data into streams (e.g., two streams). Inverse fast Fourier transform (IFFT) and/or time domain processing may be performed on a stream (e.g., separately on each stream). One or more streams may be mapped onto a channel (e.g., each stream to a channel or two streams to two channels). Data may be transmitted. A receiver may perform a reverse process, and the combined data may be sent to the MAC.

Sub 1 GHz modes of operation may be supported by 802.11af and/or 802.11ah. Channel operating bandwidths and carriers may be reduced, for example, relative to those used in 802.11n and/or 802.11ac. 802.11af may support, for example, 5 MHz, 10 MHz, and/or 20 MHz bandwidths in the TV White Space (TVWS) spectrum. 802.11ah may support, for example, 1 MHz, 2 MHz, 4 MHz, 8 MHz, and/or 16 MHz bandwidths using non-TVWS spectrum. In examples, 802.11ah may support one or more meter type control/Machine-Type Communications (MTC) devices in a macro coverage area. MTC device(s) may have limited capabilities and may support limited bandwidths. MTC device(s) may support a long battery life.

WLAN systems that support multiple channels and channel widths, such as 802.11n, 802.11ac, 802.11af, and/or 802.11ah, may include a channel designated as a primary channel. A primary channel may have a bandwidth (e.g., approximately) equal to a common operating bandwidth (e.g., largest common operating bandwidth) supported by one or more (e.g., all) STAs in a BSS. A bandwidth of a primary channel may be limited by one or more (e.g., all) STA operating in the BSS. A bandwidth of a primary channel may be limited by a STA that supports the smallest bandwidth operating mode. In examples (e.g., for 802.11ah), a primary channel may be 1 MHz wide, for example, when there may be STAs (e.g., MTC type devices) that (e.g., only) support a 1 MHz mode (e.g., even when the AP/PCP and other STAs in the BSS may support a 2 MHz, 4 MHz, 8 MHz, 16 MHz or other channel bandwidth operating modes). Carrier sensing and/or NAV settings may depend, for example, on the status of the primary channel. In examples, the primary channel may be busy, e.g., due to a STA supporting (e.g., only supporting) a 1 MHz operating mode transmitting to the AP/PCP. Available frequency bands (e.g., entire available frequency bands) may be considered busy even though the frequency bands (e.g., majority of frequency bands) may be idle and available.

Available frequency bands that may be used by 802.11ah in the United States may range from 902 MHz to 928 MHz. Available frequency bands that may be used in Korea may range from 917.5 MHz to 923.5 MHz. Available frequency bands that may be used in Japan may range from 916.5 MHz to 927.5 MHz. The total bandwidth available for 802.11ah may be, for example, 6 MHz to 26 MHz, e.g., which may depend on the country code.

802.11ac may support downlink Multi-User MIMO (MU-MIMO) transmission to multiple STA's in the same symbol's time frame, e.g., during a downlink OFDM symbol. Downlink MU-MIMO may be used in 802.11ah. Downlink MU-MIMO (e.g., in 802.11ac) may use the same symbol timing for multiple STA's. Interference of waveform transmissions to multiple STAs may not be an issue. One or more (e.g., all) STAs that may be involved in MU-MIMO transmission with the AP/PCP may use the same channel or band. The operating bandwidth may be the smallest channel bandwidth that is supported by the STAs in the MU-MIMO transmission with the AP/PCP.

802.11ad may support MAC and PHY layers for very high throughput (VHT), e.g., in the 60 GHz band. 802.11ad may support data rates up to 7 Gbits/s. 802.11ad may support (e.g., three) different modulation modes (e.g., control PHY with single carrier and spread spectrum, single carrier PHY and OFDM PHY). 802.11ad may use a 60 GHz unlicensed band and/or a band that that may be available globally. At 60 GHz, wavelength may be 5 mm. Compact antennas or antenna arrays may be used with 60 GHz. An antenna may create narrow RF beams (e.g., at both transmitter and receiver). Narrow RF beams may increase coverage range and may reduce interference. The frame structure of 802.11ad may facilitate a mechanism for beamforming training (e.g., discovery and tracking). A beamforming training protocol may include two components, e.g., a sector level sweep (SLS) procedure and a beam refinement protocol (BRP) procedure. An SLS procedure may be used for (e.g., coarse) transmit and receive beamforming training. A BRP procedure may enable (e.g., iterative) refinement of transmit and/or receive beams. MIMO transmissions (e.g., SU-MIMO and MU-MIMO) may not be supported by 802.11ad.

Figure 2:
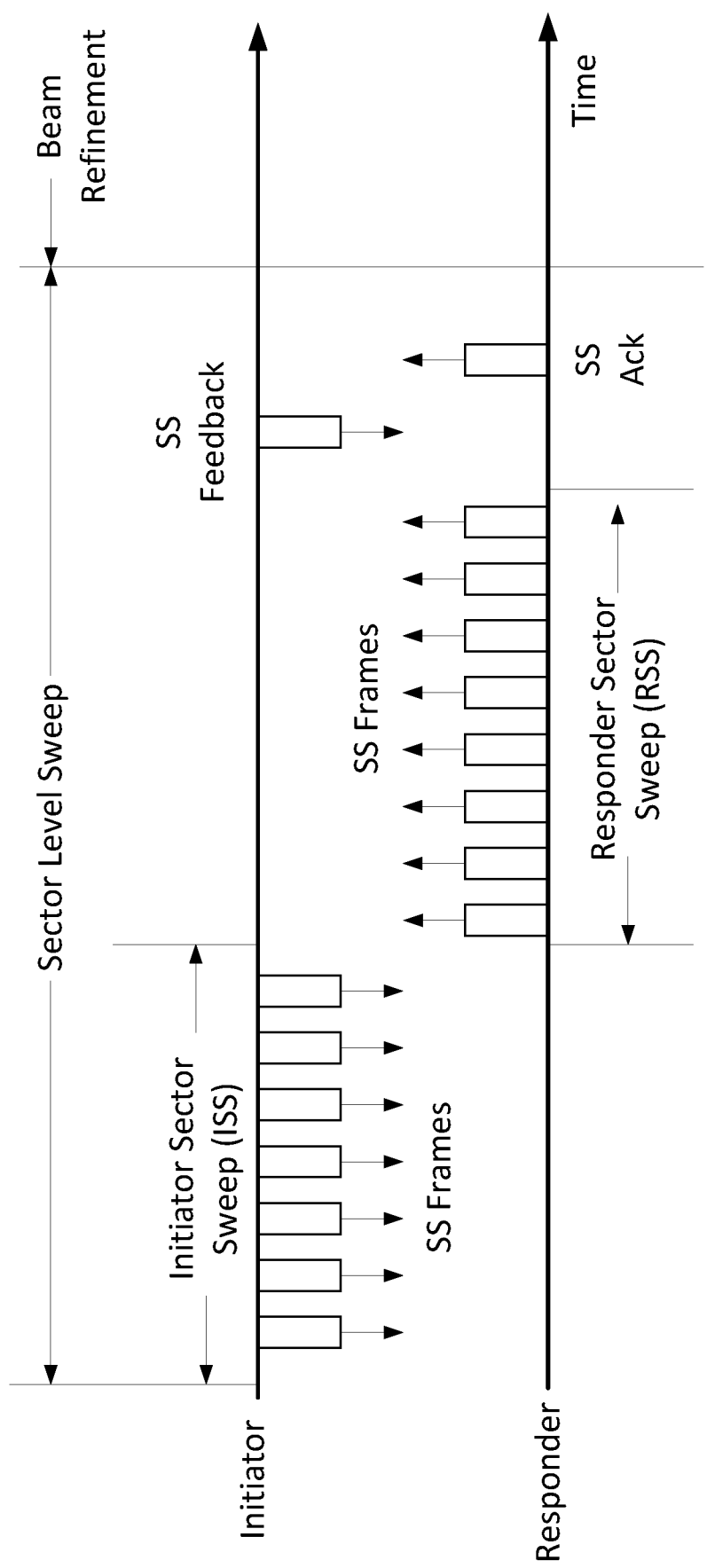
FIG. 2 is an example of sector level sweep (SLS) training.

FIG. 2 is an example of sector level sweep (SLS) training. SLS training may be performed, for example, using a Beacon frame or a sector sweep (SSW) frame. An AP/PCP may repeat a Beacon frame with multiple beams/sectors within each Beacon interval (BI). Multiple STAs may perform BF training simultaneously. An AP/PCP may not be able to sweep one or more (e.g., all) sectors/beams within one BI (e.g., due to the size of the Beacon frame). A STA may wait one or more BIs to complete initiator sector sweep (ISS) training. Latency may occur. A SSW frame may be utilized (e.g., for point to point BF training). A SSW frame may be transmitted (e.g., using control PHY), for example, using the SSW frame format (e.g., as shown in FIG. 3).

FIG. 3 is an example format for a selection sector sweep (SSW) frame.

FIG. 4 is an example format for a SSW field in a SSW frame.

FIG. 5 is an example of a SSW feedback field in a SSW frame.

Figure 6:
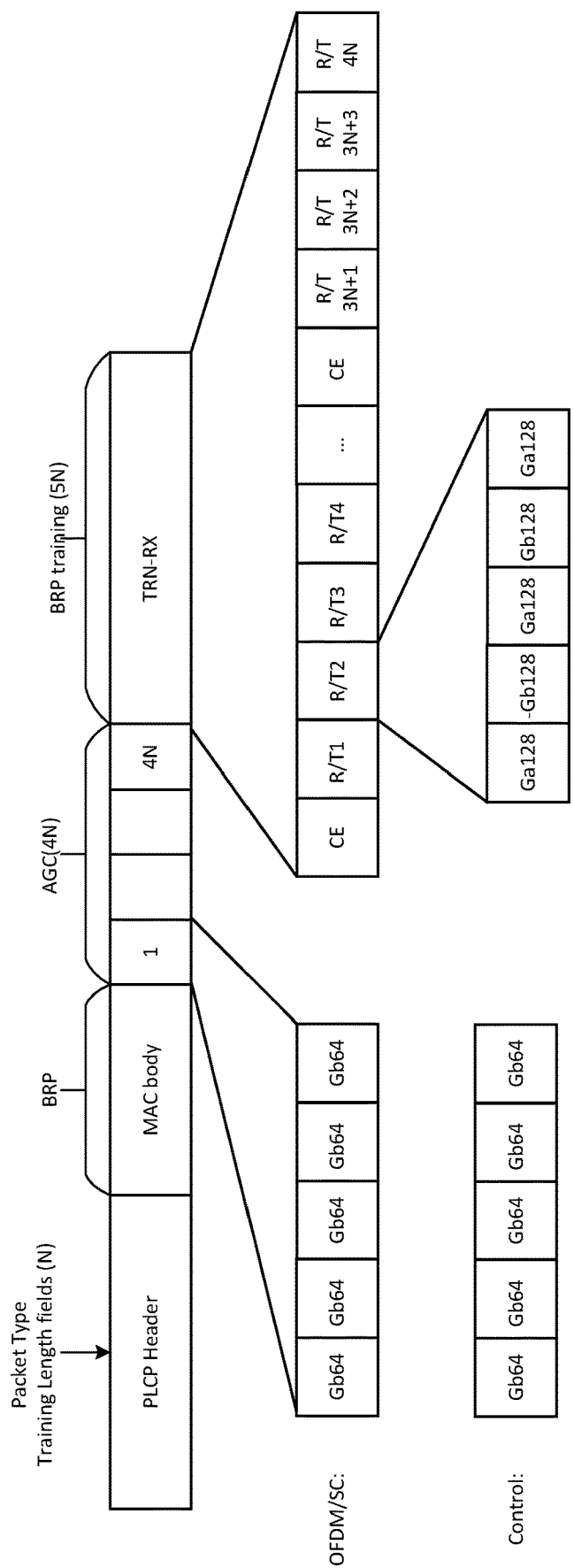
FIG. 6 is an example physical (PHY) layer convergence procedure (PLOP) protocol data unit (PPDU) carrying a beam refinement protocol (BRP) frame and training (TRN) fields.

FIG. 6 is an example Physical (PHY) Layer Convergence Procedure (PLCP) Protocol Data Unit (PPDU) carrying a beam refinement protocol (BRP) frame and training (TRN) fields. Beamforming Refinement Protocol (BRP) may be a process where a STA may improve its antenna configuration (e.g., or antenna weight vectors) (e.g., for transmission and/or reception). BRP packets may be used (e.g., in a beam refinement procedure) to train a receiver and/or transmitter antenna. There may be two types of BRP packets, e.g., beamforming refinement protocol receiver (BRP-RX) packets and beamforming refinement protocol transmitter (BRP-TX) packets. A BRP packet may be carried by a DMG PPDU and may be followed by a training field. A training field may contain an AGC field and may contain a transmitter or receiver training field (e.g., as shown in FIG. 6).

A value of N (e.g., in FIG. 6) may be a Training Length (e.g., training length given in the header field). A training length may indicate that an AGC may have 4N subfields and may indicate that the TRN-R/T field may have 5N subfields. A CE subfield may the same as or similar to a CE subfield in the preamble. One or more (e.g., all) subfields in the beam training field may be transmitted, for example, using rotated π/2-BPSK modulation. A BRP MAC frame may be an Action No ACK frame and may have, for example, one or more of the following fields: Category, Unprotected DMG Action, Dialog Token, BRP Request field, DMG Beam Refinement element, and/or Channel Measurement Feedback element 1 to Channel Measurement Feedback element k.

FIG. 7 is an example of a DMG PPDU format. 802.11ad may support, for example, four PHYs, (e.g., single carrier (SC) PHY, OFDM PHY, Control PHY, and/or low power SC PHY). PHYs may share the same packet structure with or without sharing the same fields.

A directional multi-gigabit (DMG) header may be provided. In the SC PHY, the header may include one or more of the following fields. The header may include a scrambler initialization field. The scrambler initiation field may be one or more bits (e.g., 7 bits). The header may include a base modulation and coding set (MCS) field. The base MCS field may be one or more bits (e.g., 5 bits). The header may include a length field. The length field may be one or more bits (e.g., 18 bits). The header may include an additional PLCP Protocol Data Unit (PPDU) field. The additional PPDU field may be one or more bits (e.g., 1 bit). The header may include a packet type field. The packet type field may be one or more bits (e.g., 1 bit). The header may include a training length field. The training length field may be one or more bits (e.g., 5 bits). The header may include an aggregation field. The aggregation field may be one or more bits (e.g., 1 bit). The header may include a beam tracking request field. The beam tracking request field may be one or more bits (e.g., 1 bit). The header may include a last received signal strength indication (RSSI) field. The last RSSI field may one or more bits (e.g., 4 bits). The header may include a turnaround field. The turnaround field may be one or more bits (e.g., 1 bit). The header may include an extended SC MCS indication field. The extended SC MCS indication field may be one or more bits (e.g., 1 bit). The header may include a reserved parameter field. The reserved parameter field may be one or more bits (e.g., 3 bits). The header may include a header check sequence (HCS) parameter field. The HCS parameter field may be one or more bits (e.g., 16 bits).

An IEEE 802.11ay physical layer (PHY) and an IEEE 802.11ay medium access control layer (MAC) may have at least one mode of operation capable of supporting a maximum throughput of at least 20 gigabits per second (e.g., measured at the MAC data service access point) and may maintain or improve power efficiency (e.g., per station). An IEEE 802.11ay physical layer (PHY) and IEEE 802.11ay medium access control layer (MAC) may have license-exempt bands above 45 GHz that may have backward compatibility and/or may coexist with directional multi-gigabit stations (e.g., legacy stations, which may be defined by IEEE 802.11ad) operating in the same band. 802.11ay may operate in the same band as other standards (e.g., legacy standards). There may be backward compatibility and/or coexistence with legacy standards in the same band.

FIG. 8 is an example of channel bonding versus aggregation framework. 802.11 ay may support MIMO, channel bonding, and/or channel aggregation.

In examples of channel bonding and aggregation, a set of Tx/Rx pairs may transmit/receiver over multiple component channels (e.g., bands). A primary channel (e.g., in an 802.11 system) may be a component channel on which full carrier sense (e.g., physical and virtual) may be maintained. 802.11 functions (e.g., AP association, probing, and reassociation) may occur on a primary channel.

In examples of channel bonding, a Tx/Rx pair may use multiple component channels as a single transmission channel for data. In examples of channel aggregation, multiple component channels may be used independently (see, e.g., FIGS. 8 and 9).

WLANs may support channel bonding data transmission.

Figure 9:
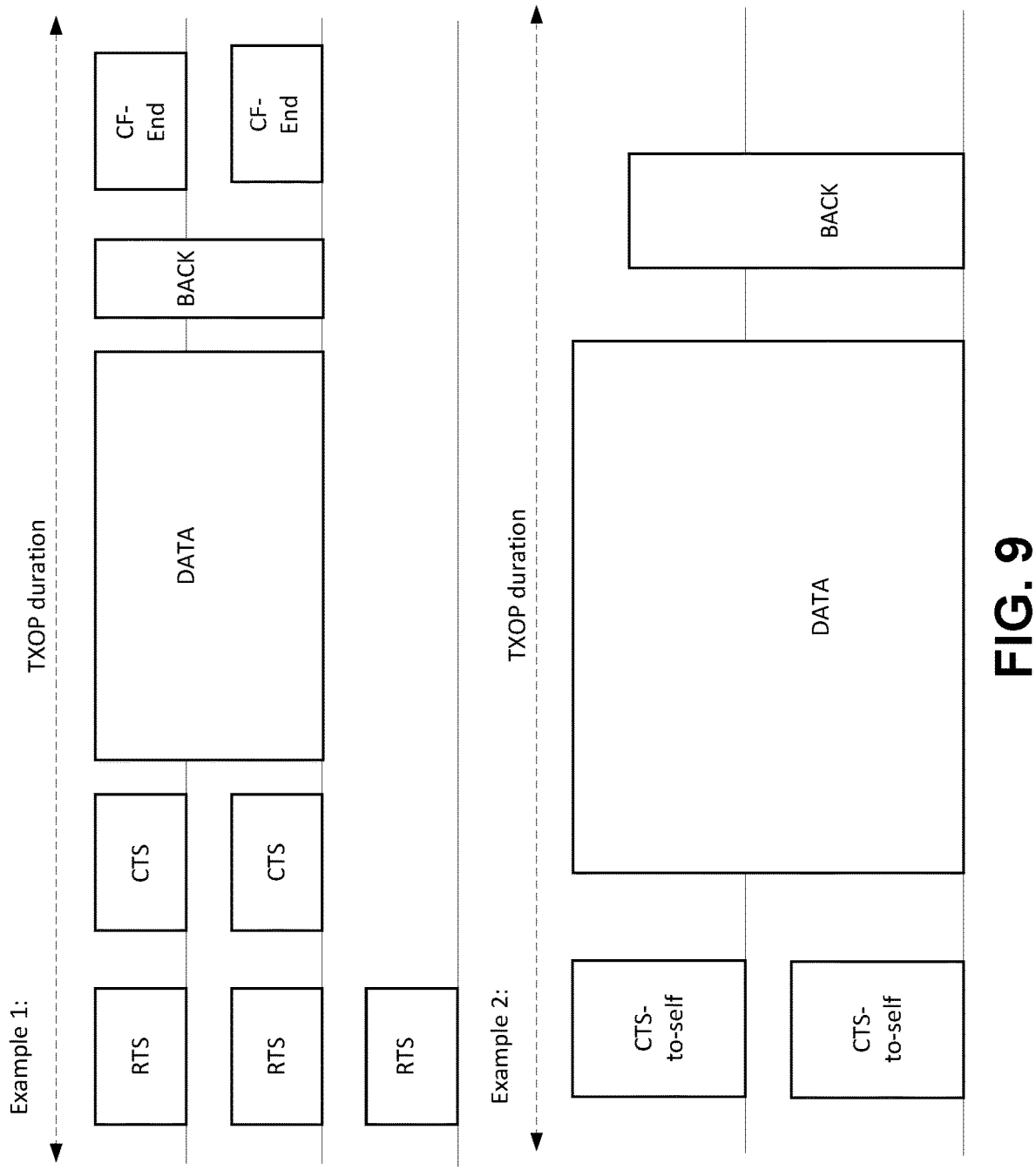
FIG. 9 provides examples of channel bonding.

FIG. 9 provides examples of channel bonding.

A transmitter may (e.g., as shown in example 1 in FIG. 9) reserve a medium with independent RTS frames on the channels to be bonded. A receiver may reply with a CTS. The transmitter may send a channel bonded data transmission to the receiver. Indication of bonding may be placed, for example, in the RTS or in the preamble of the transmitted data frame. The receiver may reply with a channel bonded ACK. The transmitter may reply with two CF-ENDs to end the transmit opportunity (TXOP) reservation.

A transmitter may (e.g., as shown in example 2 in FIG. 9) reserve a medium with CTS-to-self frames on the channels to be bonded. The transmitter may send a channel bonded data transmission to a receiver. Indication of bonding may be placed, for example, in the RTS or in the preamble of the transmitted data frame. The receiver may reply with a channel bonded ACK.

Full carrier sense (e.g., physical and/or virtual) may be maintained on a primary channel.

An enhanced directional multi gigabit (EDMG) STA may transmit a frame to a peer EDMG STA to indicate intent to perform channel bonding transmission to the peer STA. This may allow an EDMG STA to choose to operate over multiple channels after receiving such a frame, which may save power.

802.11ay may support (e.g., when using multiple channels) simultaneous transmission by a PCP or an AP to multiple STAs allocated to different channels (e.g., individually).

802.11ay may support allocation of service period(s) (SP(s)) and scheduled contention-based access period(s) (CBAP(s)) over more than one channel and/or over a bonded channel. Allocations may or may not include a primary channel. Source and destination of allocations may be different, for example, when allocations over different channels overlap in time. Channels used for allocations may be limited to the operating channels of the BSS.

FIG. 10 is an example of channelization.

Channel bonding and channel aggregation may be supported. Examples of channel aggregation modes may be, for example, 2.16 GHz+2.16 GHz, 4.32 GHz+4.32 GHz, and/or 4.32+2.16 GHz aggregation modes. EDMG-Header-A (e.g., a PHY header for EDMG devices) may have, for example, one or more of the following fields: (i) bandwidth; (ii) channel bonding (e.g., to differentiate between channel bonding and channel aggregation); and/or (iii) primary channel.

Fields may be included in a Control Trailer for RTS/CTS setup. A duplicated RTS/CTS approach may carry the bandwidth information for efficient channel bonding operation.

Figures 11, 12:
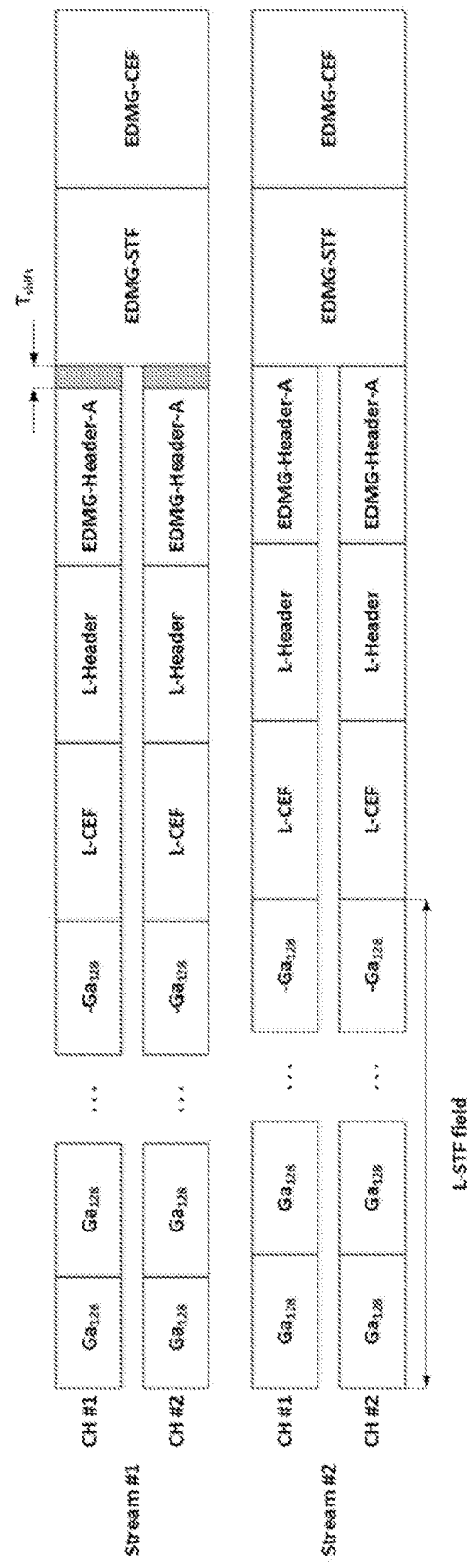
FIG. 11 is an example of an enhanced DMG (EDMG) preamble format.
FIG. 12 is an example of an EDMG preamble for multi-channel multi-stream transmissions.

FIG. 11 is an example of an EDMG preamble format.

FIG. 12 is an example of an EDMG preamble for multi-channel multi-stream transmissions.

The EDMG preamble format may be used for multi-channel transmission with MIMO. A multi-stream transmission of a non-EDMG part of preamble may utilize cyclic shifts.

EDMG-short training field (EDMG-STF) may support channel bonding. An EDMG-STF field for spatial stream "i" may be built from multiple repetitions of a Gwi sequence. Gwi may be composed of Golay sequences, where Gwi= [GaiN, GaiN, GaiN, −GaiN]. N may be a sequence length (e.g., 128, 256, and 512 for CB=1, 2, and 4, respectively). CB may refer to channel bonding. Chip duration may be Tc=0.57 ns.

Golay sequences of length N=256, and 512 may be used for channel bonding of 2 and 4, e.g., similar to the EDMG-STF field.

An EDMG-Header_B field may be optional for MIMO transmission. A coding and modulation scheme may be used for EDMG-Header-B, for example, for single carrier (SC) PHY MU-MIMO. An EDMG-Header-B field may be transmitted using two SC symbol blocks.

In examples, for a (e.g., each) SC symbol block, part of coded and modulated EDMG-Header-B symbols (e.g., refer as blki for ith stream) may be carried by 448 chips and a Guard Interval (GI) with a Golay Gai64 sequence of length 64 chips may be appended thereto. A SC symbol block without channel bonding may be [Gai64, blki]. In examples, for channel bonding with 2, 3, and 4 channels, a SC symbol block may be defined, respectively as: (i) NCB=2: [Gai128, blki, blki]; (ii) NCB=3: [Gai192, blki, blki, blki]; and (iii) NCB=4: [Gai256, blki, blki, blki, blki].

Frequency-based multiple access with multi-channel transmission may be provided. 802.11ay may support (e.g., when using multiple channels) simultaneous transmission by a PCP or an AP to multiple STAs allocated to different channels (e.g., individually). Support (e.g., procedures) may be provided for transmission to and reception from different STAs.

Beamforming may be provided to support multi-channel transmission.

FIG. 13 is an example of EDMG-STF.

802.11 ay systems may support transmit and/or receive beam(s) that enable single beam and/or multi-beam transmission(s) between two or more nodes. Support may be provided (e.g., with channel bonding or aggregation) for the formation of beams and transmission/reception of control information and data that account for the bandwidth coherence of aggregated or bonded channels.

Information in the EDMG-header may be provided.

802.11ay may provide and/or perform channel aggregation and/or bonding transmission. For example, 802.11ay may provide and/or perform channel aggregation and/or bonding transmission to one or more users on one or more channels. A channel may include one or more MU-MIMO transmissions to one or more STAs. Signaling may be provided to a receiver STA. For example, signaling may be provided to a receiver STA such that the receiver STA may not perform (e.g., may not be required to perform) decoding for one or more PSDUs in a PPDU.

A MIMO-setup frame may precede (e.g., immediately precede) a MU PPDU. For example, a MIMO-setup frame may precede (e.g., immediately precede) a MU PPDU from a transmitter (e.g., the same transmitter). The coverage of the preamble transmitted in a preamble waveform in the MIMO-setup frame may be identical to the preamble in the MU- PPDU that follows. This may incur an extra overhead. The extra overhead may be avoided.

EDMG design may not identify BSS and/or TXOP information. Not identifying BSS and/or TXOP information may have one or more of the following effects.

For example, an effect may be that an intra-BSS frame may be missed. Due to the directional nature of the 802.11ay, frames from 2 BSSs may overlap (e.g., may overlap in time). If frames from 2 BSS overlap (e.g., overlap in time), a transmitter may not hear other transmitters. For example, for a receiving STA attempting to decode an overlapping BSS (OBSS) frame, the receiving STA may have missed a concurrent intra-BSS frame. For a SU-PPDU, the receiving STA may decode (e.g., need to decode) the data portion of the PPDU. The receiving STA may decode (e.g., need to decode) the data portion of the PPDU to determine whether the receiving STA may be the receiver and/or to update NAV. The receiving STA may decode (e.g., need to decode) the data portion of the PPDU to determine whether the receiving STA may be the receiver and/or to update NAV, even if the frame is an OBSS frame. For a MU-PPDU, an OBSS frame may have a matching association ID (AID) in EDMG-header-A. The STA with an identical AID may receive an OBSS frame and/or may ignore the intra-BSS frame.

An effect may be that the battery may be drained. For example, decoding the data portion of an OBSS frames may drain the battery.

Multi-channel aggregation and channel bonding may be provided. For example, multi-channel aggregation and channel bonding may include one or more of the following: multi-channel aggregation for a single transmitter/receiver pair and/or multi-channel aggregation and bonding for multiple transmitter/receiver pairs with frequency and space based multiple access.

FIG. 14 illustrates examples of channel aggregation and bonding in 802.11ay. In examples, a transmitter may reserve a medium with independent RTS frames on the channels to be bonded (e.g., FIG. 14A). A receiver may reply with a CTS. The transmitter may send a channel aggregated data transmission to the receiver. An indication of aggregation may be placed, for example, in the RTS or in the preamble of the transmitted data frame. The receiver may reply with two channel aggregated ACKs. The transmitter may reply with two contention-free ends (CF-ENDs) to end the TXOP reservation.

In examples, a transmitter may reserve a medium with CTS-to-self frames on the channels to be bonded, as shown in FIG. 14B. The transmitter may send a channel aggregated data transmission to the receiver. An indication of aggregation may be placed, for example, in the RTS or in the preamble of the transmitted data frame. The receiver may reply with two channel aggregated ACKs.

Multi-channel aggregation and channel bonding may include, for example, multiple transmitter/receiver pairs with frequency- and/or space-based multiple access.

Examples may be provided for channel bonding and aggregation for multiple users. Multi-channel transmission procedures may allow for multiple component channels to be used in a frequency-based multiple access manner. For example, a STA/WTRU (e.g., the transmitter/receiver and PCP/AP or Transmission point (TRP)) may transmit or receive from multiple STAs (e.g., the receivers/transmitters). This may be applicable to channel bonding and channel aggregation (see, e.g., FIGS. 15 and 16), which may be combined with spatial multiple access.

FIG. 15 is an example of channel bonding with frequency-based multiple access using OFDMA.

FIG. 16 is an example of channel aggregation with frequency-based multiple access using SC and OFDMA.

Frequency-based multiple access may be based on Orthogonal Frequency Division Multiplexing (OFDM) or Single Carrier transmission.

Single-carrier transmission with frequency-based multiple access may be applied to aggregation (e.g., alone). A (e.g., each) component carrier may have an independent SC waveform transmitted on it. A preamble may be identical or component specific, for example, in a downlink transmission. A (e.g., each) preamble may be transmitted (e.g., transmitted independently) on a (e.g., each) component channel, for example in an uplink transmission. Transmissions may occur at a time such that the transmissions may arrive at the transmitter within a tolerance time. A user may transmit an identical beam that may span the aggregated channels. An (e.g., each) independent user may be assigned to a bandwidth spanning a (e.g., each) component sub-channel. More than one user may be assigned to a sub-channel. Users may be separated (e.g., separated spatially) based on, for example, different arrival/departure directions and/or time delays (see, e.g., FIG. 17).

Figure 17:
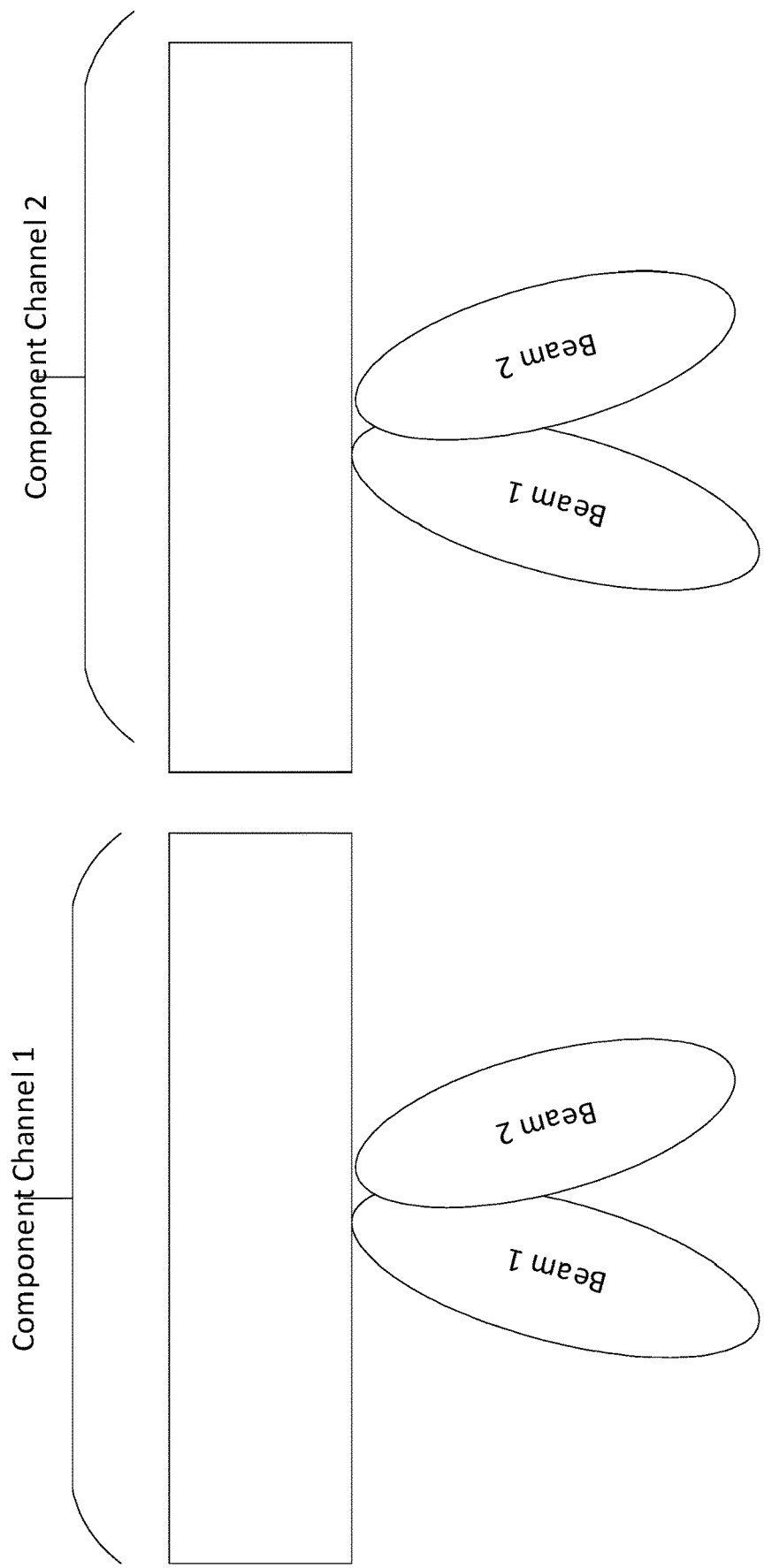
FIG. 17 is an example of channel aggregation with a single carrier transmission and multiple spatial beams.

FIG. 17 is an example of channel aggregation with a single carrier transmission and multiple spatial beams.

OFDM-based transmission with frequency-based multiple access may be applied to aggregation and bonding. A bandwidth of sub-channels may, for example, be set to the bandwidth of a component channel or to a set of bandwidths that may be less than the bandwidth of a (e.g., each) component channel. An (e.g., each) independent user may be assigned one or more sub channels in the frequency domain. More than one user may be assigned to a sub-channel and may be separated (e.g., separated spatially) based on, for example, different arrival/departure directions and time delays (see, e.g., FIGS. 18 and 19).

Figure 18:
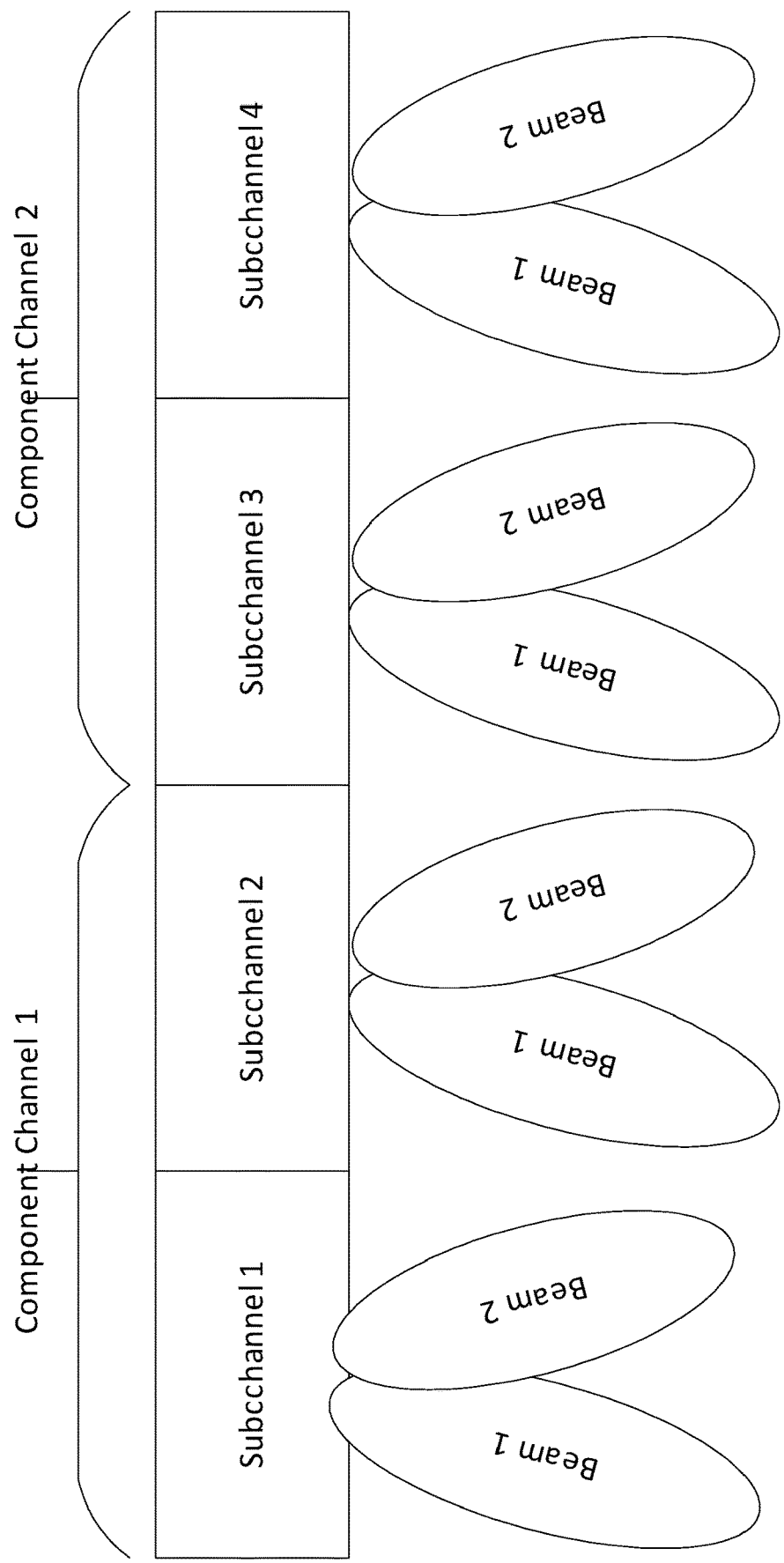
FIG. 18 is an example of channel bonding with OFDMA and multiple spatial beams per sub-channel.

FIG. 18 is an example of channel bonding with OFDMA and multiple spatial beams per sub-channel.

Figure 19:
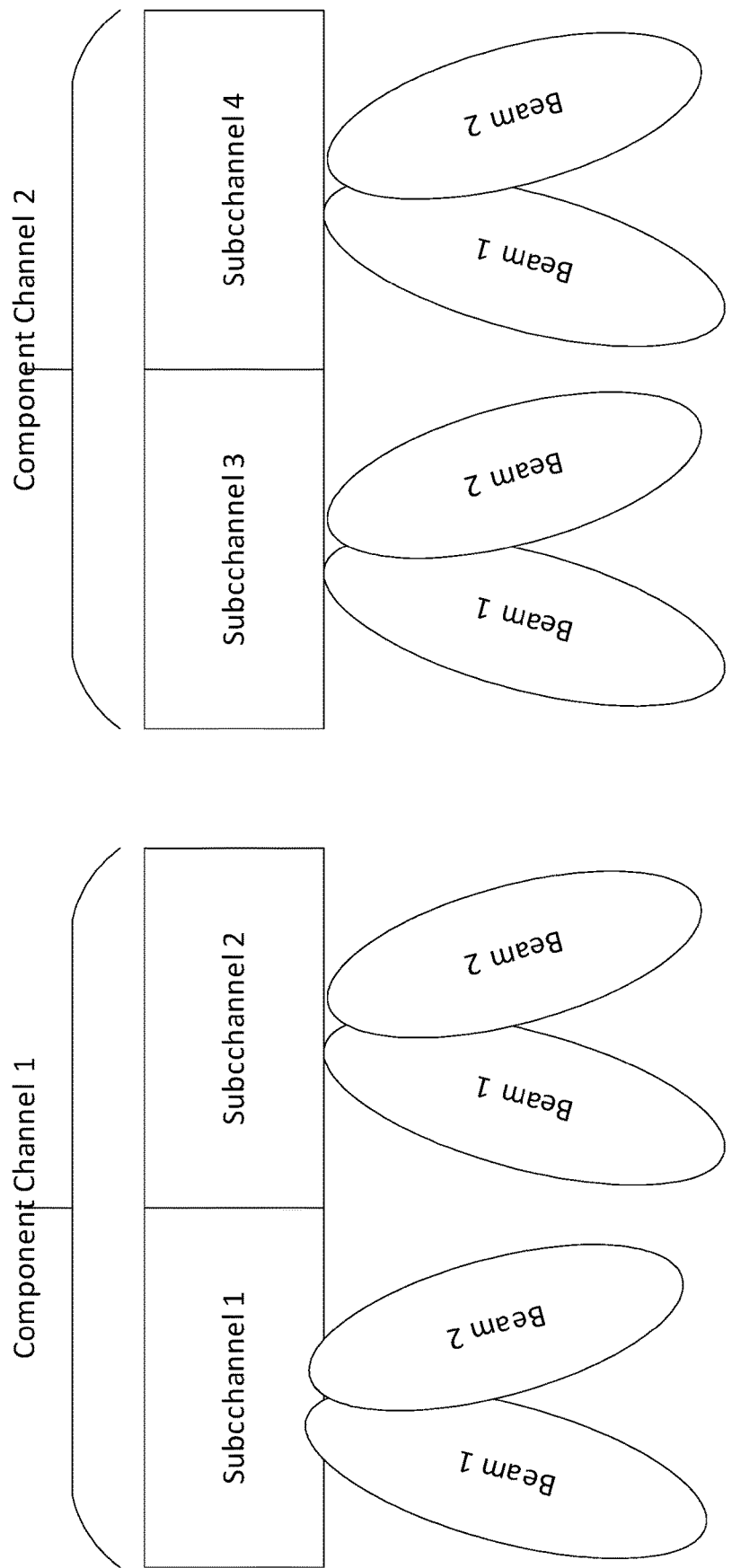
FIG. 19 is an example of channel aggregation with OFDMA and multiple spatial beams per sub-channel.

FIG. 19 is an example of channel aggregation with OFDMA and multiple spatial beams per sub-channel.

Beamforming implementations may be disclosed that support multi-channel transmission. For example, one or more of the following may apply: multi-channel beamforming; one analog beam across two channels (e.g., analog BF training on a (e.g., each) channel) and a separate analog circuit on a (e.g., each) channel or a single analog circuit on both channels; one analog beam across two channels (e.g., analog BF training on both channels) and separate digital precoding schemes on a (e.g., each) channel, which may support SU; one analog beam across a primary channel (e.g., analog BF training on primary channel only) and separate digital precoding schemes on a (e.g., each) channel, which may support SU; and/or two analog beams on two channels (e.g., analog BF training on both channels) and separate digital precoding schemes on a (e.g., each) channel, which may support SU and/or MU.

Beamforming (e.g., beamforming for multi-channel transmission) may work on a (e.g., each) component channel independently or on the multiple component channels as a single channel. The use of the same beam or different beams over the multiple component channels may depend on, for example, one or more of the following: (i) correlation between the spatial signatures of the multiple channels; (ii) the domain a beamformer is in; (iii) digital domain beamforming; and/or (iv) hybrid beamforming.

The use of the same beam or different beams over the multiple component channels may depend on a correlation between the spatial signatures of multiple channels. Channels whose spatial signatures are correlated may comprise adjacent, small bandwidth channels or channels that may be less than a coherence bandwidth apart. The same beams may be used across multiple channels without a significant loss in performance, with a reduction in beamforming training, and/or feedback overhead.

Channels whose spatial signatures are not correlated may comprise channels that may be greater than the coherence bandwidth apart. Use of the same beams across the channels may result in a performance loss.

The use of the same beam or different beams over the multiple component channels may depend on the domain a beamformer is in. Examples associated with analog domain beamforming may be provided.

For analog beamforming (e.g., for analog beamforming only), beams may be formed by phasors on antenna elements in the analog domain. Separate beams per stream may be created for a (e.g., each) of the multiple channels. One or more of the following features may apply.

A (e.g., each) channel may have an independent or separately controllable physical antenna array or antenna panel. This may allow for selection of an optimal analog beam, for example, even when multiple channels may not be within a coherence bandwidth of the physical channel. The granularity of analog beams may be, for example, on the order of the bonded or aggregated channels or on the order of OFDMA sub-channels within a (e.g., each) component channel.

A (e.g., single) analog beamformer may be used across one or more (e.g., all) of the channels. The (e.g., single) beamformer may be created based on the primary channel.

Figure 20:
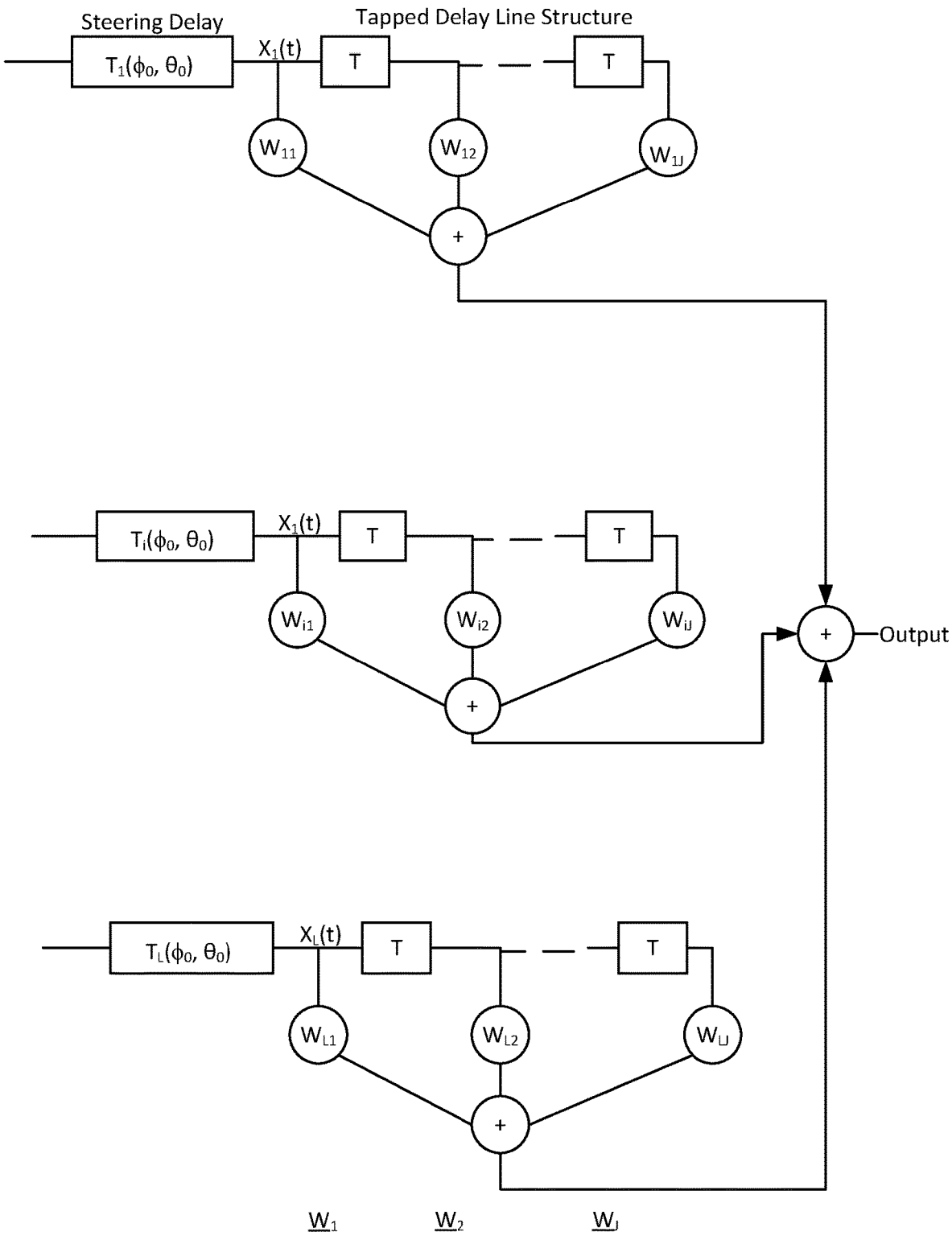
FIG. 20 is an example of a broadband beamformer.

A (e.g., single) beamformer may be created based on a combination of component channels (e.g., all the component channels). A broadband beamformer may have a frequency selective response matched to the channel. A single beamformer may be followed by a broadband analog circuit or filter made from active or passive filter components, which may improve performance. In examples of a broadband beamformer (e.g., as shown in FIG. 20), steering delays may be used to specify a look direction. A TDL structure may be used to specify a frequency response in the look direction. Elements of the analog filter may be optimized in the procedure. An analog filter made up of active components may be used to construct the broadband filter.

FIG. 20 is an example of a broadband beamformer.

The use of the same beam or different beams over multiple component channels may depend on digital domain beamforming (e.g., digital domain beamforming only). Digital beamforming may have more flexibility in enabling independent beamforming per channel or per sub-channel. This may be expensive, for example, when there may be a large number of antennas in the phase-array antenna (PM).

The use of the same beam or different beams over the multiple component channels may depend on hybrid beamforming. A combination of wideband analogue beamforming and frequency selective digital beamforming may be used. Analog beamformers may be based on the (e.g., entire) aggregated or bonded channel, the component channels or subchannels of the component channels. A digital domain beamformer may be used to correct for errors in the analog beamformer. A digital domain beamformer may enable its performance on the digital domain beamformer only.

Multi-channel beamforming may be provided. The multi-channel beamforming may include one or more of the following: a modified sector sweep procedure; a modified spatial beam refinement procedure; and/or a frequency refinement procedure.

A modified sector sweep procedure may estimate a spatial beam pairs (e.g., the best spatial beam pairs) between an initiator and a responder that may be implemented N/N_ssw times. N_ssw may be the number of independent analog beams in frequency with 1<N_ssw<N. If N_ssw=N, a (e.g., each) component channel may have its own independent analog beam. In examples where N_ssw=1, one or more (e.g., all) component beams may have (e.g., only) one analog beam. In examples, component beams may be grouped (e.g., arbitrarily grouped), for example, where N_ssw_1≠N_ssw_2≠ . . . ≠ . . . N_ssw_n and N_ssw_1+ N_ssw_2+ . . . + . . . N_ssw_n=N. This information may be signaled to the STAs during the SSW setup procedure.

A modified spatial beam refinement procedure may refine the best spatial beams (e.g., estimated best spatial beam pairs from the modified sector sweep procedure) to a user. The procedure may be implemented N/N_brp times. N_brp may be the number of independent analog beams in frequency with 1<N_brp<N. If N_brp=N, a (e.g., each) component channel may have its own independent analog beam. In examples where N_brp=1, one or more (e.g., all) the component beams may have one analog beam (e.g., only one analog beam). Component beams may be grouped (e.g., arbitrarily grouped), for example, where N_brp_1≠N_brp_2≠ . . . ≠ . . . N_brp_n and N_brp_1+ N_brp_2+ . . . + . . . N_brp_n=N. This information may be signaled to the STAs, e.g., during the BRP setup procedure. In examples, N_brp may be equal to N_ssw.

A frequency refinement procedure may correct mismatch between the actual channel and the channel estimated using the refined beams. The frequency refinement procedure may be analog or digital.

Figure 21:
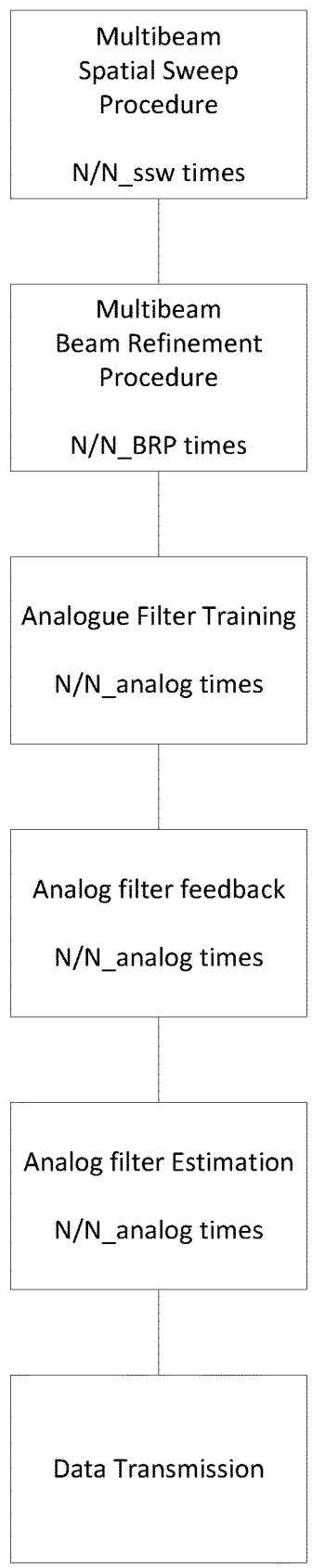
FIG. 21 is an example procedure for analog beamforming.

FIG. 21 is an example procedure for analog beamforming (e.g., analog only beamforming). In examples of an analog frequency refinement procedure, a series of signals may be sent to enable the estimation of a time domain correlation. This information may be fed back and used to estimate the TDL or active analog filter. The number of independent analog filters may be determined, for example, by N_analog (see, e.g., FIG. 21).

Figure 22:
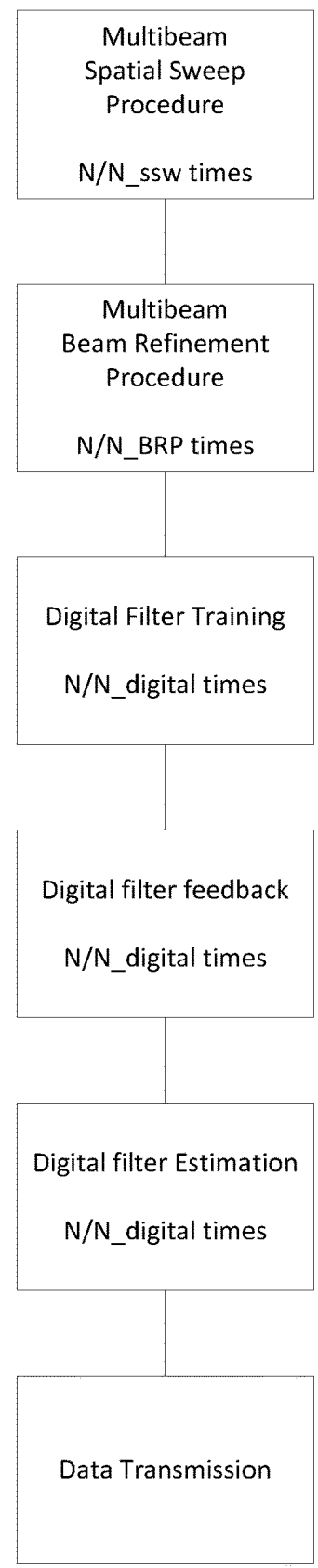
FIG. 22 is an example procedure for hybrid beamforming.

FIG. 22 is an example procedure for hybrid beamforming. In examples of a digital frequency refinement procedure, a channel estimation or training field may be sent. A representation of the instantaneous channel may be fed back to enable the design for the digital precoder. The number of independent digital filters may be determined, for example, by N_digital (see, e.g., FIG. 22). N_analog/N_digital may differ from N_ssw.

Schemes, procedures, and their applications may be provided for single user, multi-user, and diversity transmission. In examples, N-component channels may be aggregated and/or bonded. Examples may use N=2, but the schemes and procedures may be applicable to (e.g., extendable to) N>2.

There may be one analog beam across two channels (e.g., analog BF training on a (e.g., each) channel) and a separate analog circuit on a (e.g., each) channel or a single analog circuit on both channels. One or more of the following may apply: an analog beam-training procedure; spatial beam refinement; and/or multi-channel beam refinement.

An analog beam-training procedure may identify the best spatial beam(s) using a modified sector level sweep. The training procedure may identify the best spatial beams, e.g., with multiple spatial beams. A sweep may occur for initiator (Tx/Rx) and responder (Tx/Rx). Finding one set of beams may be sufficient (e.g., Initiator Tx and Responder Rx), for example, when a channel reciprocity assumption is valid (e.g., due to calibration).

The system may go through (e.g., further go through) spatial beam refinement. For example, the system may go through further spatial beam refinement, such as a modified Beam Refinement Protocol (BRP), to refine the analog beams.

The system may identify the spatial beams (e.g., the best spatial beams). The system may (e.g., when the spatial beams have been identified) go through a multi-channel beam refinement procedure to train and/or estimate parameters for the analog circuit. A multi-channel beam refinement procedure may involve estimation of an array correlation matrix (R). Matrix elements may represent the correlation between various tap outputs. The amount and frequency of feedback may be reduced (e.g., in a correlation), for example, compared with digital baseband feedback. A feedback request may indicate whether an explicit channel feedback or a correlation feedback may be required. Signaling may be added to request correlation matrix feedback (e.g., which may be different than channel element feedback used in a BRP feedback).

Elements of the filter may be estimated based on a desired metric.

A TDL estimation frame may be constructed to assist in the estimation of R. A BRP frame with TRN/T and TRN/R may be re-used (e.g., to assist in the estimation of R).

There may be one analog beam across two channels (e.g., analog BF training on both channels) and separate digital precoding schemes on a (e.g., each) channel, which may support SU.

A single analog beam-training procedure may identify the best spatial beam(s), for example, using a modified sector level sweep. The training procedure may identify the best spatial beams on multiple (e.g., both) component channels, for example, when there may be multiple spatial beams. A sweep may occur for initiator (Tx/Rx) and responder (Tx/Rx). Finding one set of beams may be sufficient (e.g., Initiator Tx and Responder Rx), for example, when the channel reciprocity assumption may be valid (e.g., due to calibration).

The system may go through (e.g., go through further) spatial beam refinement (e.g., a modified Beam Refinement Protocol to refine the analog beams). A (e.g., each) channel may (e.g., when the spatial beams have been identified) go through a digital baseband channel estimation procedure to estimate the effective digital baseband channel. The digital baseband channel may be fed back to the transmitter. In examples, the explicit channel co-efficient(s) may be fed back. In examples, an implicit feedback based on a codebook may be fed back. A (e.g., each) sub-channel may estimate its digital precoder (e.g., based on a selected scheme).

Figure 23:
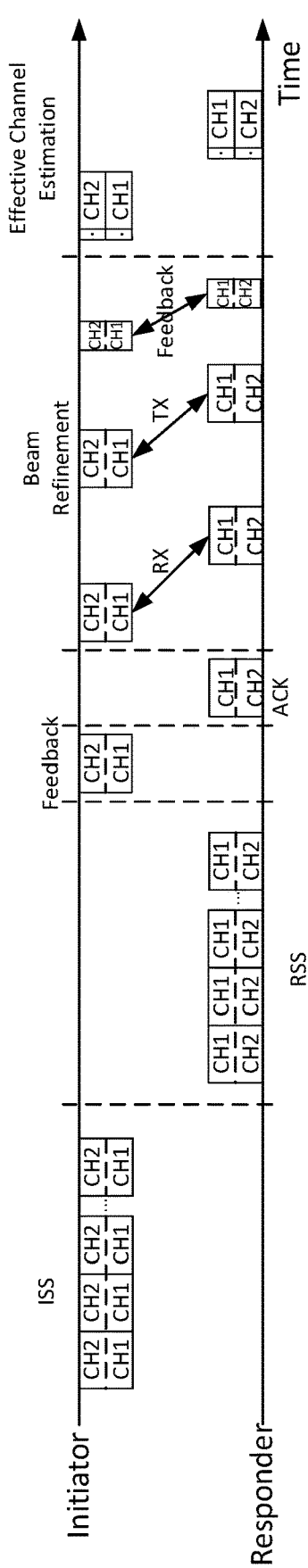
FIG. 23 is an example procedure for one analog beam across two channels.

FIG. 23 is an example procedure for one analog beam across two channels. One analog beam may be formed across two channels with a set of phase shifters. One or more of the following may apply. An initiator may start an SLS with one analog beam across two channels to identify the best spatial beam. A responder may carry out (e.g., carry out similarly) an SLS with one analog beam across two channels. Feedback and ACK may be sent (e.g., sent jointly) on both channels. A beam refinement protocol (BRP) (e.g., on both channels) may be implemented, for example, when requested by the initiator or the responder. An effective channel estimation may be conducted based on the best beam pair, for example, when the best spatial beams are identified. The initiator may transmit a channel estimation packet on both channels. Effective channels may be estimated for both channels (e.g., independently). The responder may feed back the effective channel information on both channels.

There may be one analog beam across a primary channel (e.g., analog BF training on primary channel only) and separate digital precoding schemes on a (e.g., each) channel, which may support SU.

A single analog beam-training procedure may identify the best spatial beam(s), for example, using a modified sector level sweep. The training procedure may identify the best spatial beams based on the primary component channel only, for example, when there may be multiple spatial beams. A sweep may occur for initiator (Tx/Rx) and responder (Tx/Rx). Finding one set of beams may be sufficient (e.g., Initiator Tx and Responder Rx), for example, when the channel reciprocity assumption may be valid (e.g., due to calibration).

The system may go through (e.g., go through further) spatial beam refinement (e.g., a modified Beam Refinement Protocol to refine the analog beams) on the primary component channel only. A (e.g., each) channel may (e.g., when the spatial beams have been identified) go through a digital baseband channel estimation procedure to estimate the effective digital baseband channel. The analog beam for the primary channel may be used on one or more (e.g., all) the component channels.

The digital baseband channel may be fed back to the transmitter. In examples, explicit channel co-efficient(s) may be fed back. In examples, an implicit feedback based on a codebook may be fed back. A (e.g., each) sub-channel may estimate its digital precoder, for example, based on a selected scheme.

Figure 24:
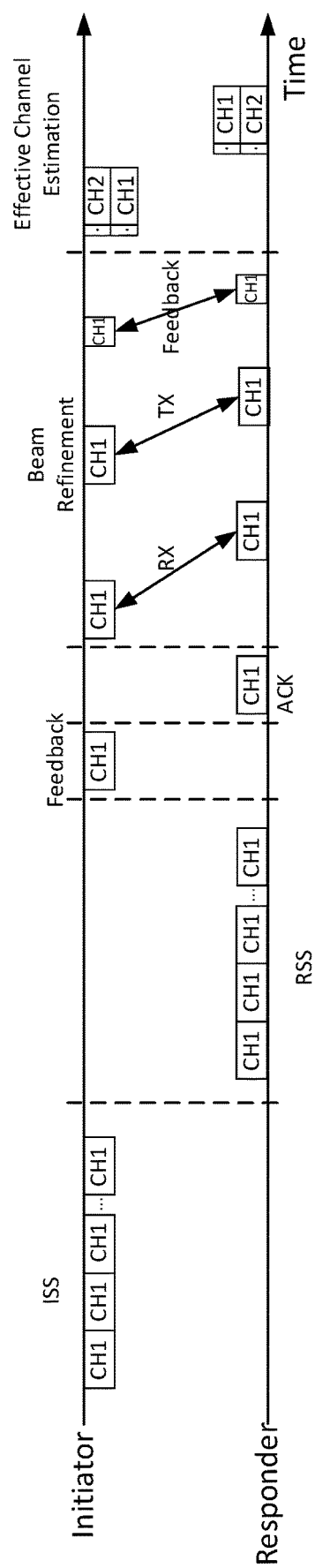
FIG. 24 is an example procedure for one analog beam across a primary channel.

FIG. 24 is an example procedure for one analog beam across a primary channel. CH1 may be the primary channel. One analog beam may be formed, for example, based on the primary channel with a set of phase shifters. One or more of the following may apply. An initiator may start an SLS with one analog beam across the primary channel to identify the best spatial beam on the channel. A responder may (e.g., similarly) carry out an SLS with one analog beam for the primary channel. Feedback and ACK may be sent on the primary channel (e.g., only on the primary channel). A beam refinement protocol (BRP) on the primary channel may occur, for example, when requested by the initiator or the responder. An effective channel estimation may be conducted on both channels (e.g., based on the best beam pair obtained from the primary channel), for example, when the best spatial beams have been identified.

A secondary channel (e.g., channel 2) may use the beam obtained by the primary channel (e.g., channel 1).

The initiator may transmit a channel estimation packet on both channels. Effective channels may be estimated for both channels (e.g., independently).

The responder may feed back the effective channel information on both channels.

There may be two analog beams on two channels (e.g., analog BF training on both channels) and separate digital precoding schemes on a (e.g., each) channel, which may support SU and/or MU.

In examples, multiple analog beam-training procedures may identify the best spatial beam(s), e.g., using a modified sector level sweep. A training procedure may identify the best spatial beams for a (e.g., each) component channel, for example, when there may be multiple spatial beams. A sweep may occur for initiator (Tx/Rx) and responder (Tx/

Rx). Finding one set of beams may be sufficient (e.g., Initiator Tx and Responder Rx), for example, when the channel reciprocity assumption may be valid (e.g., due to calibration). The system may go through (e.g., further go through) spatial beam refinement (e.g., a modified Beam Refinement Protocol to refine the analog beams). A (e.g., each) channel may (e.g., when the spatial beams have been identified) go through a digital baseband channel estimation procedure to estimate the effective digital baseband channel. The digital baseband channel may be fed back to the transmitter. In examples, explicit channel co-efficient(s) may be fed back. In examples, an implicit feedback based on a codebook may be fed back.

A (e.g., each) sub-channel may estimate its digital precoder, for example, based on a selected scheme.

Figure 25:
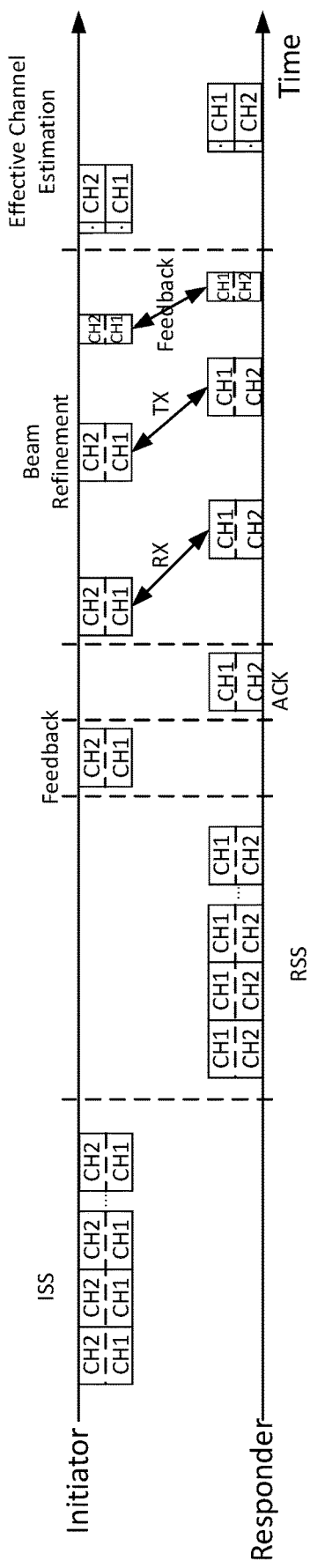
FIG. 25 is an example of two analog beams on two channels.

FIG. 25 is an example of two analog beams on two channels. FIG. 25 shows an example of an SU situation. Two analog beams may be formed on two channels with two sets of phase shifters. One or more of the following may apply. An initiator may start an SLS with two analog beams on two channels to identify the best spatial beam (e.g., independently). A responder may carry out an SLS with two independent analog beams (e.g., similarly) on two channels. Feedback and ACK may be sent (e.g., sent independently) on both channels. A beam refinement protocol (BRP) may occur on both channels, for example, when requested by the initiator or the responder. The best spatial beams may be identified. An effective channel estimation may be conducted (e.g., independently), for example, based on the best beam pairs for the two channels. An initiator may transmit a channel estimation packet on both channels. Effective channels may be estimated for both channels (e.g., independently). The responder may feed back the effective channel information on both channels.

Figure 26:
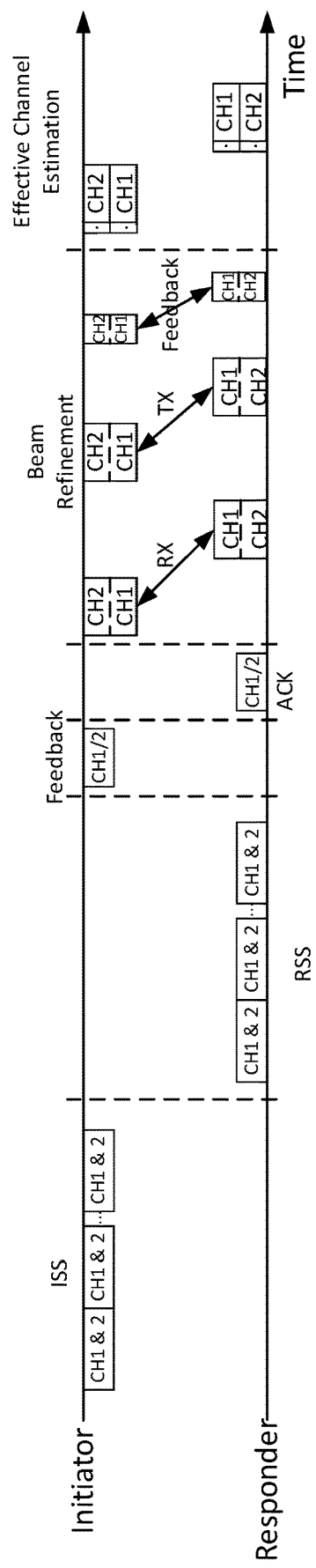
FIG. 26 is an example of two consecutive channels within the coherence bandwidth.

FIG. 26 is an example of two consecutive channels within the coherence bandwidth. Coherence bandwidth may be a statistical measurement of the range of frequencies over which the channel may be considered flat. For example, the approximate maximum bandwidth or frequency interval over which two frequencies of a signal may experience (e.g., may likely to experience) comparable or correlated amplitude fading. Improved beamforming training may be adopted, for example, when two consecutive channels within the coherence bandwidth are used. The two channels may have similar channel information in angular domain, which may be exploited for beamforming training. Two analog beams may be formed on two channels with two sets of phase shifters. One or more of the following may apply. An initiator may start an SLS with two consecutive analog beams on two channels to identify the best spatial beam(s). A (e.g., each) channel may have an individual non-overlapped beam. Beams may be broadened. If the beams are broadened, SSW time may be shortened or the sector sweeping time may be increased. A responder may carry out an SLS with two consecutive independent analog beams on two channels (e.g., similarly). Feedback and ACK may be sent (e.g., sent independently) on the specific channel (e.g., channel 1 or 2) with the best beam. An independent beam refinement protocol (BRP) on both channels may occur, for example, when requested by the initiator or the responder. The best spatial beam(s) may be identified. An effective channel estimation may be conducted (e.g., conducted independently), for example, based on the best beam pairs for the two channels. An initiator may transmit a channel estimation packet on both channels. Effective channels may be estimated for both channels (e.g., independently). The responder may feed back the effective channel information on both channels.

Figure 27:
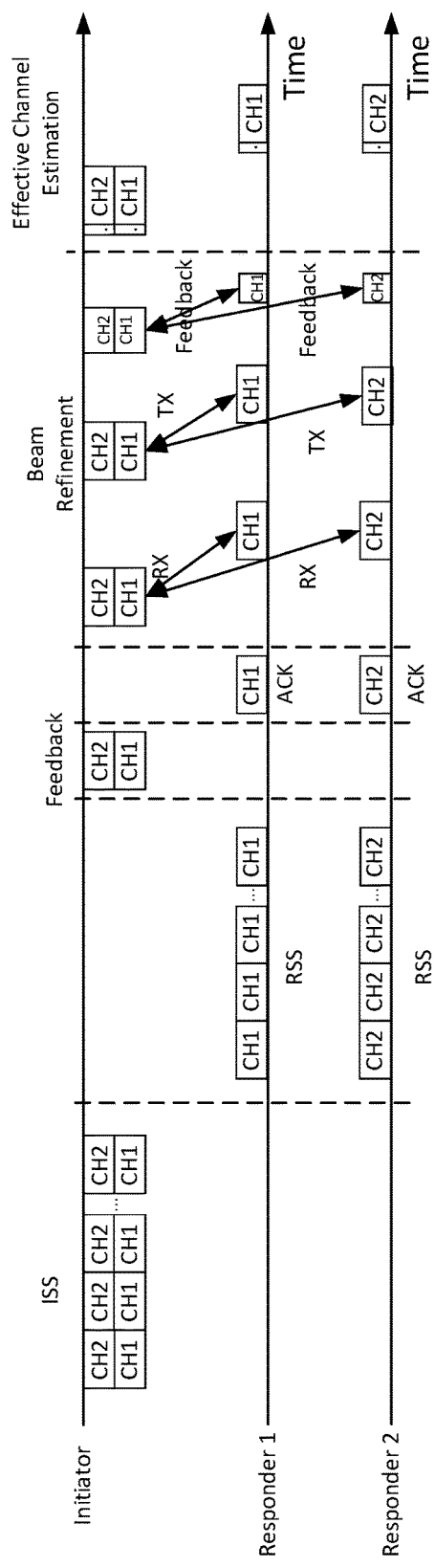
FIG. 27 is an example of two analog beams on two channels.

FIG. 27 is an example of two analog beams on two channels. FIG. 27 shows an example of a frequency-division MU situation. In examples of a frequency-division multi-user situation, users may be able to hear on both channels and may have a pre-defined channel for transmission. In examples, responder 1 may use channel 1, and responder 2 may use channel 2. Two analog beams may be formed on two channels with two sets of phase shifters. One or more of the following may apply. An initiator may start an SLS with two analog beams on two channels to identify the best spatial beam(s) (e.g., independently). Responders (e.g., responder 1 and responder 2 shown in FIG. 27) may carry out an SLS with analog beams on their individual channels, respectively. Feedback and ACK may be sent (e.g., sent independently) on individual channels for different responders. A beam refinement protocol (BRP) for both users on both channels may occur, for example, when requested by the initiator or the responder. The best spatial beams may be identified. An effective channel estimation may be conducted, for example, based on the best beam pairs of the two different channels for different users. The initiator may transmit a channel estimation packet on both channels. Effective channels may be estimated on individual channels for different users (e.g., independently). Responders may feed back the effective channel information on individual channels, respectively.

Figure 28:
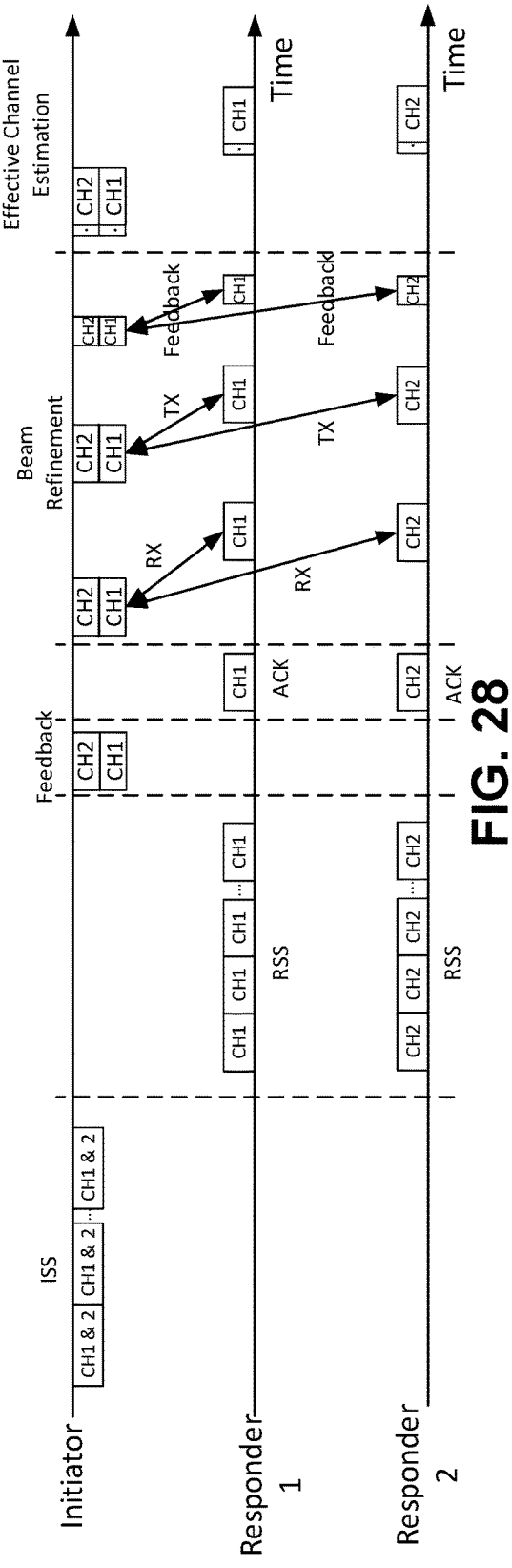
FIG. 28 is an example of two consecutive channels within the coherence bandwidth.

FIG. 28 is an example of two consecutive channels within the coherence bandwidth. FIG. 28 shows an example of a frequency-division MU situation. Improved beamforming training may be adopted, for example, when two consecutive channels within the coherence bandwidth are used. Multiple users may be able to hear on both channels. Users may have a pre-defined channel for transmission. In examples, responder 1 may use channel 1 and responder 2 may use channel 2. Two analog beams may be formed on two channels with two sets of phase shifters. One or more of the following may apply. An initiator may start an SLS with two consecutive analog beams on two channels to identify the best spatial beam. A (e.g., each) channel may have an individual non-overlapped beam. Beams may be broadened. SSW time may be shortened or the sector sweeping time may be increased. Responders (e.g., responder 1 and responder 2 shown in FIG. 28) may carry out a SLS with analog beams on their individual channels, respectively. Feedback and ACK may be sent (e.g., sent independently) on individual channels for different responders. A beam refinement protocol (BRP) for both users on both channels may occur, for example, when requested by the initiator or the responder. The best spatial beam(s) may be identified. An effective channel estimation may be conducted, for example, based on the best beam pairs of the two different channels for different users. The initiator may transmit a channel estimation packet on both channels. Effective channels may be estimated on individual channels for different users (e.g., independently). Responders may feed back effective channel information on individual channels, respectively.

Figure 29:
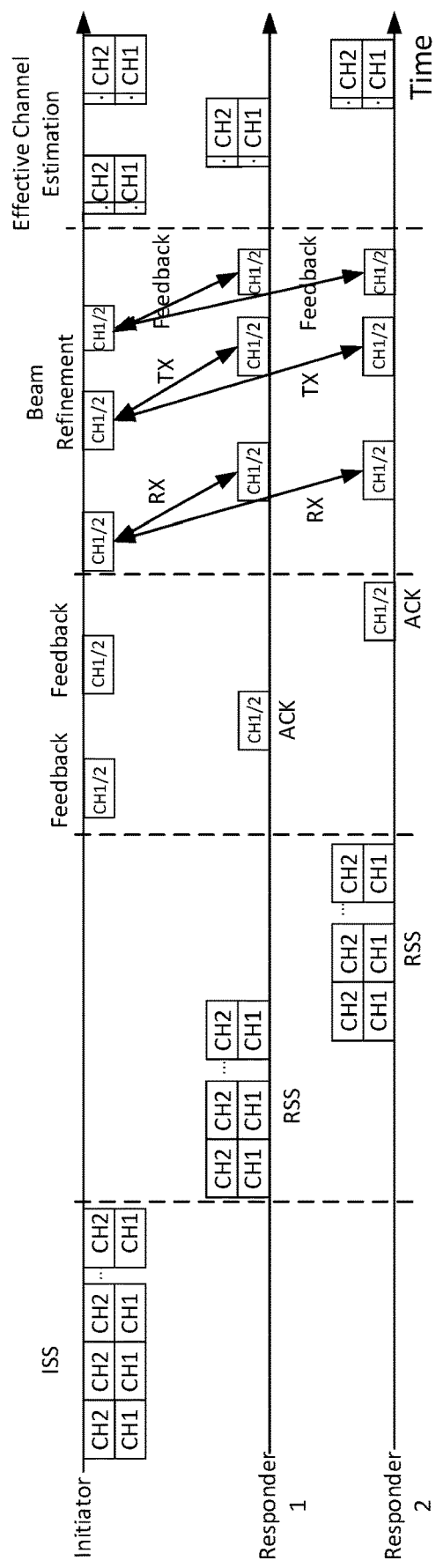
FIG. 29 is an example of time-division MU.

FIG. 29 is an example of a time-division MU situation. In examples of a time-division multi-user situation, users may be able to use both channels. Two analog beams may be formed on two channels with two sets of phase shifters. Users and channels may be jointly arranged, for example, when a (e.g., each) set of phase shifters has one (e.g., only one) steering direction. One or more of the following may apply. An initiator may start an SLS with two analog beams on two channels jointly for multiple (e.g., all) users.

Responders may carry out an SLS with analog beams on both channels, e.g., in a time-division manner. The initiator may identify the best beam for a (e.g., each) user on the dominant channel or on multiple (e.g., both) channels. Feedback and ACK may be sent (e.g., sent independently) on selected channels for different responders, e.g., in a time-division manner. A beam refinement protocol (BRP) for both users on selected channels may occur, for example, when requested by the initiator or the responder. The best spatial beams may be identified. An effective channel estimation may be conducted, for example, based on the best beam pairs of the two different channels for different users. An initiator may transmit a channel estimation packet on both channels. Effective channels may be estimated on individual channels for different users, e.g., in a time-division manner. Responders may feed back the effective channel information on both channels, e.g., respectively.

Channel information for an STA (e.g., each station) may be provided.

The EMG-header A may include channel assignment/allocation information for a user. For example, for a multi-channel multi-user transmission (e.g., a transmission involving more than one bonded/aggregated channels and/or one or more users), the EDMG-header A may include channel assignment/allocation information for a (e.g., each) user. The channel assignment information may include the resources assigned to an STA. For example, the channel assignment information may include the resources assigned to an STA, such as Spatial Stream (SS) allocation and/or channel/frequency information that may be conveyed to the receiving STA.

An EDMG header-A may be repeated on a channel. For example, an EDMG header-A (e.g., an identical EDMG header-A) may be repeated on a channel that may be occupied by the PPDU. The EDMG header B may (e.g., may only) contain information that may be relevant to a STA (e.g., the STA that may be assigned to the channel).

The EDMG header A on a channel may (e.g., may only) contain SS and/or channel allocation information. For example, the EDMG header A on a channel may (e.g., may only) contain the SS and/or channel allocation information for a channel, such that the content of EDMG header-A may be different on a channel for a (e.g., the same) PPDU.

Overhead reduction of legacy preamble in a transmission following MIMO setup may be provided.

One or more header fields in the EDMG preamble may be omitted from the PPDU. For example, to reduce the preamble overhead following a MIMO-setup frame, one or more combinations of the first 4 header fields in the FIG. 11 EDMG preamble (e.g., legacy-short training field (L-STF), legacy-channel estimation field (L-CEF), L-header, EDMG-header-A) may be omitted from the PPDU that may be transmitted after the MIMO setup frame.

The information in the omitted header may be derived from the MIMO-setup frame and/or the EDMG-header B of the MU PPDU that omits the header.

The L-header length field and/or the NAV/Duration field of the MIMO setup frame may signal a time that may include the duration of the subsequent PPDU that may omit the headers. For example, the L-header length field and/or the NAV/Duration field of the MIMO setup frame may signal a time that may include the duration of the subsequent PPDU that may omit the headers, such that STAs may identify an equivalent PPDU duration.

BSS identification and/or TXOP information may be provided.

BSS identification may be included in the EDMG-header A. For example, BSS identification may be included in the EDMG-header A such that an OBSS STA may ignore the PPDU. The identification may have fewer bits than the basic service set identifier (BSSID) (e.g., the actual BSSID).

EDMG-A header fields (e.g., legacy EDMG-A header fields) may contain the BSS identification. For example, legacy EDMG-A header fields may contain the BSS identification without additional signaling overhead. The signaled AID/scrambling initialization/LAST RSSI may contain a value that may be calculated from the BSS identifier.

TXOP information may be included in the EDMG header A. For example, TXOP information may be included in the EDMG header A such that the need for non-intended STAs to decode the data portion of the frame for NAV information may be eliminated.

TXOP information may be signaled in the L-header length and/or training length fields. For example, TXOP information may be signaled in the L-header length and/or training length fields to transmit (e.g., spoof) the legacy STA (e.g., like a long packet). The EDMG STA may be based on the PLOP service data unit (PSDU) length/MCS and/or other information to obtain the frame duration (e.g., actual frame duration).

BSS identification and/or TXOP information may be provided, e.g., using one or more of the following mechanism(s).

An L-header for EDMG signaling may be provided.

The sender of an EDMG frame may use the training length field of L-header to signal information useful for an EDMG receiver. The information may include one or more of the following: beam related information; spatial reuse related information; and/or BSSID or compressed BSSID.

Beam related information may enable the receiver to identify the beam changing from L-preamble part to EDMG preamble part. Beam related information may include one or more parameters. For example, beam related information may include the number of PAAs; whether polarization is utilized; and/or whether digital precoding is applied. Beam related information may (e.g., may also) include whether SISO beams, SU-MIMO beams, and/or MU-MIMO beams are used in the EDMG part.

Spatial reuse related information may include whether inter-BSS spatial reuse may be applied; whether intra-BSS spatial reuse may be applied; and/or whether power based spatial reuse may be applied.

An EDMG packet may be transmitted (e.g., spoofed) as a beam tracking request (e.g., DMG beam tracking request) for RX training. An EDMG STA may use the bits in the training length field of a beam tracking request to perform additional EDMG signaling, e.g., by spoofing the beam tracking request. For example by setting the reserved bit to 1, it may overload the training length field to signal additional EDMG information. A STA may send an EDMG frame with one or more of the following settings: a L-header Beam Tracking Requested field that may be set to 1; the packet Type field may be set to 0; and/or the training length field may request for Rx training of a desired length. By setting the reserved bit to 1, the training length field may be spoofed into sending different information.

For example, a STA may send an EDMG frame with a L-header Beam Tracking Requested field that may be set to 1, the packet Type field may be set to 0, the reserved bit 46 may be set to 1, and/or the training length field may be set to a value representing an EDMG parameter. The EDMG receiver may determine that the sender may not request a RX beam tracking training and/or may use the bits in Training length field for EDMG signaling. For example, the EDMG receiver may determine that the sender is not requesting a RX beam tracking training and/or is using the bits in the training length field for EDMG signaling.

$$TXTIME(T_c) = \left(\left\lceil \left\lceil \frac{\text{Length}}{42} \right\rceil \times \frac{672}{448} \right\rceil\right) \times 512 + 4416$$

The above equation may be an example of how a STA (e.g., a legacy STA) may compute TXTIME. For example, the above equation may be an example of how a STA (e.g., a legacy STA) may compute TXTIME for a DMG SC PHY frame (e.g., with MCS=2). For a receiver (e.g., a legacy receiver), the STA (e.g., the legacy STA) may not (e.g., could not) decode the MAC header for receiving address (RA) and/or may not (e.g., could not) respond to the beam tracking request. The STA (e.g., legacy STA) may generate a PHY-RXEND indication at the end of TXTIME. For example, the STA (e.g., legacy STA) may generate a PHY-RXEND indication at the TXTIME after the start of the packet reception.

To set the L-header Length field, the transmitter of the EDMG frame may determine the duration of the EDMG frame (e.g., EDMG automatic gain control (AGC) and/or training sequences (TRN) field(s)) and/or may set the value of the length field to approximate the duration. For example, EDMG sender may determine (e.g., may first determine) the duration of an EDMG frame (e.g., including EDMG AGC and/or TRN fields) as D (unit in $T_c$).

$$\frac{D-4416}{512} \leq \begin{cases} 3k & \text{case 1} \\ 3k+2 & \text{case 2} \end{cases}$$

where k may be the smallest integer that may satisfy the equation. The sender may set the length as:

$$\text{Length} = \begin{cases} 42 \times (2k-1) + i, & i = 1\ldots 42 \text{ if case 1} \\ 42 \times (2k) + i, & i = 1 \ldots 42 \text{ if case 2} \end{cases}$$

An EDMG frame's duration may be greater than $T_c \times (2 \times 512+4416) = 3.09$ us. In such a case, the frame may not be transmitted as a DMG BRP frame. For example, because the frame may not be transmitted as a DMG BRP frame, the EDMG frame may not be subject to aBRPminSCblocks SC blocks minimum length requirement.

As provided above, an EDMG packet may be transmitted (e.g., spoofed) as a DMG beam tracking request for RX training. Use of the 5 bits of Training length field in L-header for EDMG signaling may be independent of the duration of the EDMG frame. For example, the use of the 5 bits of Training length field in L-header for EDMG signaling may be used for EDMG frames of any duration.

An EDMG packet may be transmitted (e.g., spoofed) as a DMG BRP-TX or BRP-RX packet.

The sender may send an EDMG frame with an L-header packet Type field set to 1, the reserved bit 46 set to 1, and/or the training length field set to a value representing an EDMG parameter. The EDMG frame may be transmitted (e.g., spoofed) as a DMG BRP-TX packet. The sender may send an EDMG frame with L-header Beam Tracking Requested field set to 0, the packet Type field set to 0, the reserved bit 46 set to 1, and/or the training length field set to a value representing an EDMG parameter. The EDMG frame may be transmitted (e.g., spoofed) as a DMG BRP-RX packet.

The EDMG receiver may determine that the sender is not sending a DMG BRP packet and/or uses the bits in Training length for EDMG signaling. A legacy receiver may not be able to decode the MAC header for RA and/or may not (e.g., will not) respond to the BRP frame. The receiver may generate a PHY-RXEND indication. For example, the receiver may generate a PHY-RXEND indication at the TXTIME after the start of the packet reception.

The equation below may show an example of how a STA (e.g., a legacy STA) may compute TXTIME for a DMG SC PHY frame (e.g., with MCS=2). A setting of training length field ($N_{TRN}$) may be used for EDMG signaling (e.g., when the value of the length field is used to calculate a TXTIME). To let a STA (e.g., legacy STA) compute the TXTIME of the EDMG frame (e.g., the same TXTIME of the EDMG frame), the EDMG sender may set the Length field of L-header such that the TXTIME is approximately the same as the EDMG frame duration (e.g., EDMG packet frame duration). For example, the setting of Length=42 k, 42 k+1, . . . 42 k+41 may result in a TXTIME (e.g., the same TXTIME) so the 5 bits signaled by the Length field (e.g., used as EDMG information) may be independent of the 5 bits signaled by the Training length field (e.g., also used as EDMG information). The setting of Length field as provided herein may be independent of the 5 bits signaled by the Training length field, even though the value of transmitted (e.g., spoofed) length field may be adjusted, e.g., based on the transmitted Training length field.

$$TXTIME(T_c) = \max\left(\left\lceil \left\lceil \frac{\text{Length}}{42} \right\rceil \times \frac{672}{448} \right\rceil, 18\right) \times 512 + 4416 + 4992 \times N_{TRN}$$

An EDMG frame may use the full 5 bits of Training length field in L-header for EDMG signaling. For example, an EDMG frame whose TXTIME $(T_c) \geq T_c \times (18 \times 512+4416+4992 \times 31) = 95.67$ us may use the full 5 bits of training length field in L-header for EDMG signaling. A shorter EDMG frame may be provided. For example, a shorter EDMG frame may be provided when the EDMG packet is transmitted as a DMG BRP-TX or BRP-RX packet, as described herein. A shorter EDMG frame may be provided when the sender of the EDMG frame sets the training length as the EDMG information with a full resolution (e.g., 5 bits) and when the STA interprets the frame as being longer in duration than the actual short EDMG frame, e.g., as described herein.

Use of a variation of fields (e.g., fields other than training Length of the L-header) to signal additional EDMG information may be provided.

The Beamtracking request and/or Packet Type may vary. For example, the Beamtracking request and/or Packet Type may vary by choosing one or more signaling procedures, such as an EDMG packet being transmitted as a DMG beam tracking request for RX training and/or an EDMG packet being transmitted as a DMG BRP-TX or BRP-RX packet. By varying the Beamtracking request and/or Packet Type, EDMG information (e.g., additional EDMG information) may be signaled. For example, 1 more bit of EDMG information may be signaled using examples described herein. For example, 1 more bit of EDMG information may be signaled by identifying which type DMG packet is used to carry the EDMG packet: a beam tracking request for RX training and/or a BRP-TX or a BRP-RX packet. The MCS signaled in L-header may be interpreted as EDMG information (e.g., additional EDMG information).

A short EDMG frame may be provided.

The duration of an EDMG frame may be short when an EDMG frame is transmitted as a DMG BRP-TX or BRP-RX packet. The duration of an EDMG frame may be short to reduce the overhead of a transmission (e.g., a short Sector Sweep frame (short SSW frame) which may 4 bytes while the original SSW may be 26 bytes). If an EDMG frame is short and the EDMG frame is transmitted as a DMG BRP-TX or BRP-RX packet, MSBs of training length field may be set to 0. MSBs of training length field may be set to 0 to arrive to an overall duration approximating the duration of the short EDMG packet. Setting the MSBs of Training Length field to 0 may reduce the amount of EDMG information to be carried by the Training Length field.

The EDMG receiver may have an understanding that when the duration of an EDMG frame is less than a threshold, the information carried in training length may represent a lower resolution version of the EDMG information compared to the EDMG information (e.g., the same EDMG information) that could be signaled by the training length field in an EDMG frame (e.g., a longer EDMG frame). For example, a receiver of an EDMG packet transmitted as a DMG BRP-TX or BRP-RX packet may be based on the difference between the real EDMG frame duration (e.g., acquired from EDMG header) and minimum duration of a BRP frame (e.g., $T_c \times (18 \times 512 + 4416)$) to calculate how many bits of EDMG information may be signaled by the L-header Training Length field.

The sender of the EDMG frame may set the training length as the EDMG information with a full resolution (e.g., 5 bits). A third-party STA (e.g., a legacy STA) may interpret the frame as being longer in duration than the actual short EDMG frame.

The terminology EDMG used herein may be replaced by Enhanced. For example, the corresponding EDMG feature may be an enhanced feature.

Features, elements and actions are described by way of non-limiting examples. While examples are directed to 802.11 protocols, subject matter herein is applicable to other wireless communications and systems. Each feature, element, action, or other aspect of the described subject matter, whether presented in figures or description, may be implemented alone or in any combination, including with other subject matter, whether known or unknown, in any order, regardless of examples presented herein.

Systems, methods, and instrumentalities have been disclosed for multiple channel transmission in mmW WLAN systems. Multi-channel aggregation and channel bonding may comprise, for example, multi-channel aggregation for a single transmitter/receiver pair or multi-channel aggregation and bonding for multiple transmitter/receiver pairs with frequency and space based multiple access. Multi-channel beamforming may comprise, for example, one analog beam across two channels and analog circuits on each channel or a single analog circuit on both channels, one analog beam across two channels and separate digital precoding schemes on each channel, one analog beam across a primary channel and separate digital precoding schemes on each channel or two analog beams on two channels and separate digital precoding on each channel.

Although features and elements may be described above in particular combinations or orders, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A device comprising:
 a processor configured to:
  determine to transmit an enhanced directional multi-gigabit (EDMG) packet frame, wherein the EDMG packet frame comprises a legacy-header (L-header), and wherein the L-header comprises a length field, a training length field, and a modulation and coding set (MCS); and
  determine values of the length field, the training length field, and the MCS, wherein when the values of the length field, the training length field, and the MCS are used to calculate a transmitter time (TXTIME), the TXTIME is approximately a same duration as an EDMG packet frame duration; and
 a transmitter configured to:
  send the EDMG packet frame with the length field of the L-header set to the determined value, and wherein reserved bit 46 in the L-header is set to a value of 1.

2. The device of claim 1, wherein the device comprises a station or an access point (AP).

3. The device of claim 1, wherein the processor is further configured to determine a duration associated with the EDMG packet frame.

4. The device of claim 1, wherein the EDMG packet frame comprises at least one of an L-header packet type field, an L-header beam tracking requested field, or a packet type field.

5. The device of claim 1, wherein the EDMG packet frame is a DMG single carrier (SC) physical (PHY) frame.

6. The device of claim 1, wherein the length field of the L-header set is less than a predetermined value.

7. A method comprising:
 determining to transmit, by a device, an enhanced directional multi-gigabit (EDMG) packet frame, wherein the EDMG packet frame comprises a legacy-header (L-header), and wherein the L-header comprises a length field, a training length field, and a modulation and coding set (MCS);
 determining values of the length field, the training length field, and the MCS, wherein when the values of the length field, the training length field, and the MCS are used to calculate a transmitter time (TXTIME), the TXTIME is approximately a same duration as an EDMG packet frame duration; and
 sending the EDMG packet frame with the length field of the L-header set to the determined value, and wherein reserved bit 46 in the L-header is set to a value of 1.

8. The method of claim 7, wherein the device comprises a station or an access point (AP).

9. The method of claim 7 further comprising: determining a duration associated the EDMG packet frame.

10. The method of claim 7, wherein the EDMG packet frame comprises at least one of an L-header packet type field, an L-header beam tracking requested field, or a packet type field.

11. The method of claim 7, wherein the EDMG packet frame is a DMG single carrier (SC) physical (PHY) frame.

12. The method of claim 7, wherein the length field of the L-header set is less than a predetermined value.

* * * * *